US012795600B2

(12) United States Patent
Shim et al.

(10) Patent No.: US 12,795,600 B2
(45) Date of Patent: Nov. 10, 2026

(54) METHOD FOR TERMINAL TO PERFORM MEASUREMENT FOR POSITIONING IN WIRELESS COMMUNICATION SYSTEM, AND DEVICE THEREFOR

(71) Applicant: LG ELECTRONICS INC., Seoul (KR)

(72) Inventors: Jaenam Shim, Seoul (KR); Hyunsoo Ko, Seoul (KR); Seunggye Hwang, Seoul (KR); Jeongsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 18/860,497

(22) PCT Filed: Apr. 27, 2023

(86) PCT No.: PCT/KR2023/005800
§ 371 (c)(1),
(2) Date: Oct. 25, 2024

(87) PCT Pub. No.: WO2023/211215
PCT Pub. Date: Nov. 2, 2023

(65) Prior Publication Data

US 2025/0301449 A1 Sep. 25, 2025

Related U.S. Application Data

(60) Provisional application No. 63/336,278, filed on Apr. 28, 2022.

(51) Int. Cl.
*H04W 64/00* (2009.01)
*G01S 5/00* (2006.01)
(Continued)

(52) U.S. Cl.
CPC ......... *H04W 64/006* (2013.01); *G01S 5/0036* (2013.01); *G01S 5/14* (2013.01); *H04W 4/025* (2013.01); *H04W 24/08* (2013.01)

(58) Field of Classification Search
CPC ....... H04W 64/00; H04W 4/029; H04W 4/02; H04W 64/006; H04W 4/025;
(Continued)

(56) References Cited

U.S. PATENT DOCUMENTS

2014/0155090 A1 6/2014 Khorashadi et al.
2020/0217918 A1 7/2020 Ryden et al.
2025/0008537 A1 * 1/2025 Sahin .................... H04W 64/00

FOREIGN PATENT DOCUMENTS

KR 10-2013-0060279 A 6/2013
WO 2022042193 A1 3/2022
(Continued)

*Primary Examiner* — Anthony S Addy
(74) *Attorney, Agent, or Firm* — BRYAN CAVE LEIGHTON PAISNER LLP

(57) ABSTRACT

Disclosed are a method for a terminal to perform a measurement related to positioning in a wireless communication system, and a device therefor, according to various embodiments. Disclosed are a method and a device therefor, the method comprising the steps of: reporting capability information about the terminal related to location measurement; receiving configuration information for the location measurement; performing a measurement on a received reference signal on the basis of the configuration information; and reporting a measurement result for the reference signal.

9 Claims, 16 Drawing Sheets

(51) Int. Cl.
*G01S 5/14* (2006.01)
*H04W 4/02* (2018.01)
*H04W 24/08* (2009.01)

(58) Field of Classification Search
CPC ... H04W 12/02; H04W 64/003; H04W 12/63; H04W 4/40; H04W 8/24; H04W 24/08; H04L 67/52; H04L 5/0048; H04L 27/26025; Y02D 30/70; G01S 5/0036; G01S 5/14; G01S 5/0236; H04B 17/27
See application file for complete search history.

(56) References Cited

FOREIGN PATENT DOCUMENTS

| | | | |
|---|---|---|---|
| WO | 2022066380 | A1 | 3/2022 |
| WO | 2022076974 | A2 | 4/2022 |

* cited by examiner

METHOD FOR TERMINAL TO PERFORM MEASUREMENT FOR POSITIONING IN WIRELESS COMMUNICATION SYSTEM, AND DEVICE THEREFOR

CROSS-REFERENCE TO RELATED APPLICATIONS

This application is a National Phase application under 35 U.S.C. 371 of International Application No. PCT/KR2023/005800, filed on Apr. 27, 2023, which claims the benefit of U.S. Provisional Application No. 63/336,278, filed on Apr. 28, 2022, the contents of which are incorporated by reference herein in their entirety.

TECHNICAL FIELD

The present disclosure relates to a method of performing positioning of a user equipment (UE) based on phase information measured by the UE in a wireless communication system and apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR).

SUMMARY

The present disclosure is to provide a method and apparatus for defining additional capability information related to carrier phase positioning (CPP) with a specific level of accuracy to ensure location estimation based on the CPP, minimizing increases in the signaling load resulting from the introduction of the CPP-based positioning by determining whether to perform the CPP based on the capability information, and improving the accuracy of the location estimation of the UE.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

In an aspect of the present disclosure, provided herein is a method of performing positioning-related measurement by a user equipment (UE) in a wireless communication system. The method includes: reporting capability information of the UE, wherein the capability information is related to position measurement; receiving configuration information for the positioning measurement; performing measurement on a received reference signal based on the configuration information; and reporting measurement results for the reference signal. The capability information may include information on a line of sight (LOS) estimation capability related to phase measurement for carrier phase positioning (CPP).

The LOS estimation capability is determined based on a granularity or sampling rate in a time domain, and inclusion of phase measurement information for the reference signal in the measurement results is determined based on the LOS estimation capability.

Based on that the LOS estimation capability is lower than a specific threshold, the measurement results include only a time of arrival (ToA) among the phase measurement information and the ToA The capability information includes the LOS estimation capability depending on a subcarrier spacing (SCS) or a frequency band.

The capability information includes the LOS estimation capability depending on a number of carriers capable of being measured simultaneously.

The capability information further includes information on a granularity or sampling rate in a phase domain.

The capability information further includes at least one of information on whether the phase measurement is performed on a plurality of carriers, information on a receiver clock error related to signal reception, or information on a transmitter clock error related to signal transmission.

The capability information is included in assistance information and transmitted to a network.

In another aspect of the present disclosure, provided herein is a UE configured to perform positioning-related measurement in a wireless communication system. The UE includes: a radio frequency (RF) transceiver; and a processor connected to the RF transceiver. The processor is configured to: control the RF transceiver to report capability information of the UE, wherein the capability information is related to position measurement; receive configuration information for the positioning measurement; perform measurement on a reference signal based on the configuration information; and report measurement results for the reference signal. The capability information includes information on a LOS estimation capability related to phase measurement for CPP.

In another aspect of the present disclosure, provided herein is a method of receiving, by a network, measurement results from a UE in a wireless communication system. The method includes: receiving capability information related to position measurement for the UE; transmitting configuration information for the position measurement based on the capability information; transmitting at least one reference signal based on the configuration information; and receiving the measurement results for the at least one reference signal. The capability information includes information on a LOS estimation capability related to phase measurement for CPP.

Based on that the LOS estimation capability is higher than or equal to a specific threshold, the configuration information includes information for instructing to report the measurement results including phase information measured for the reference signal and a time of arrival (ToA) measured for the reference signal.

Based on that the LOS estimation capability is lower than a specific threshold, the configuration information includes information for instructing to report the measurement results including a ToA measured for the reference signal.

In another aspect of the present disclosure, provided herein is a chipset configured to perform positioning-related measurement for a UE in a wireless communication system. The chipset includes: at least one processor; and at least one memory operably connected to the at least one processor and configured to, when executed, cause the at least one processor to perform operations. The operations include: reporting capability information of the UE, wherein the capability information is related to position measurement; receiving configuration information for the positioning measurement; performing measurement on a reference signal based on the configuration information; and reporting measurement results for the reference signal. The capability information includes information on a LOS estimation capability related to phase measurement for CPP.

In a further aspect of the present disclosure, provided herein is a computer-readable storage medium including at least one computer program. The at least one computer program is configured to cause at least one processor to perform operations related to positioning measurement for a UE in a wireless communication system. The at least one computer program is stored on the computer-readable storage medium. The operations include: reporting capability information of the UE, wherein the capability information is related to position measurement; receiving configuration information for the positioning measurement; performing measurement on a reference signal based on the configuration information; and reporting measurement results for the reference signal. The capability information includes information on a LOS estimation capability related to phase measurement for CPP.

According to various embodiments of the present disclosure, additional capability information related to carrier phase positioning (CPP) with a specific level of accuracy may be defined to ensure location estimation based on the CPP. In addition, it is possible to minimize increases in the signaling load resulting from the introduction of the CPP-based positioning by determining whether to perform the CPP based on the capability information while improving the accuracy of the location estimation of the UE.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
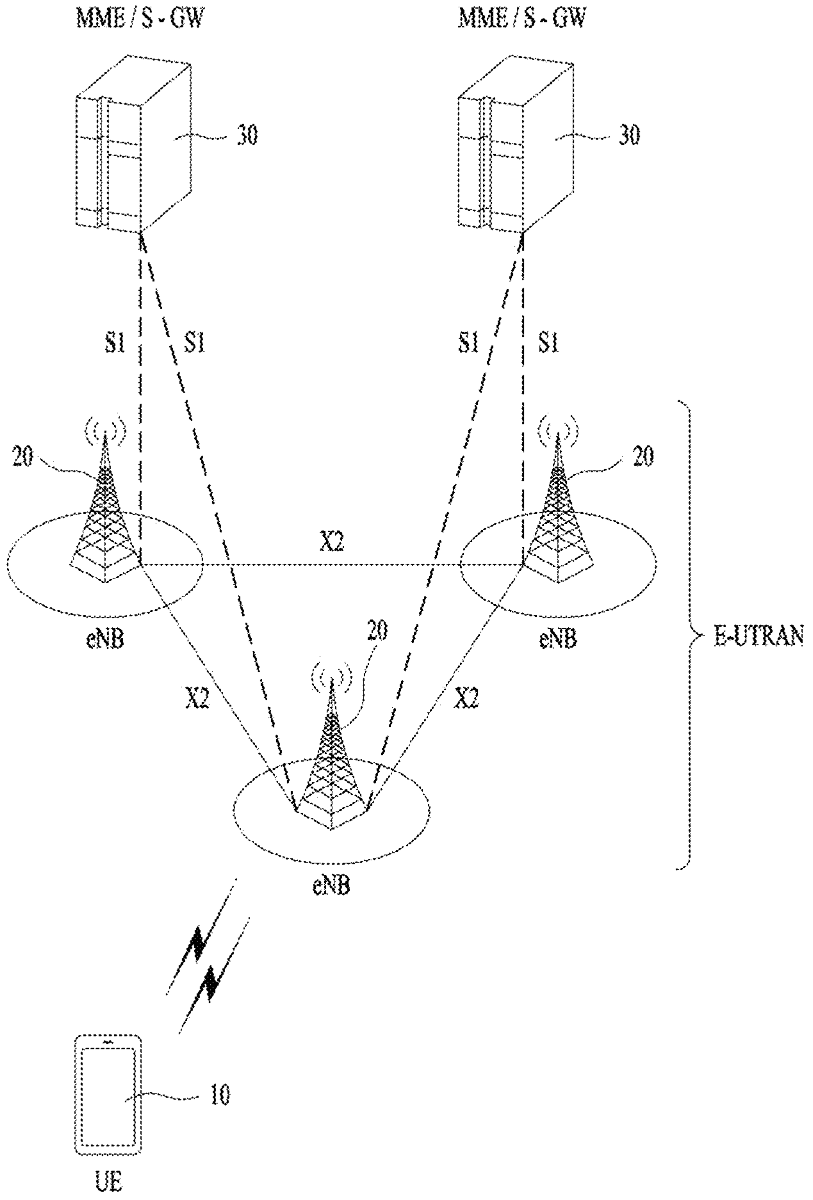
FIG. 1 illustrates the structure of an LTE system to which embodiment(s) are applicable.

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

FIG. 1 illustrates the structure of an LTE system to which the present disclosure is applicable. This may also be called an evolved UMTS terrestrial radio access network (E-UTRAN) or LTE/LTE-A system.

Referring to FIG. 1, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 2:
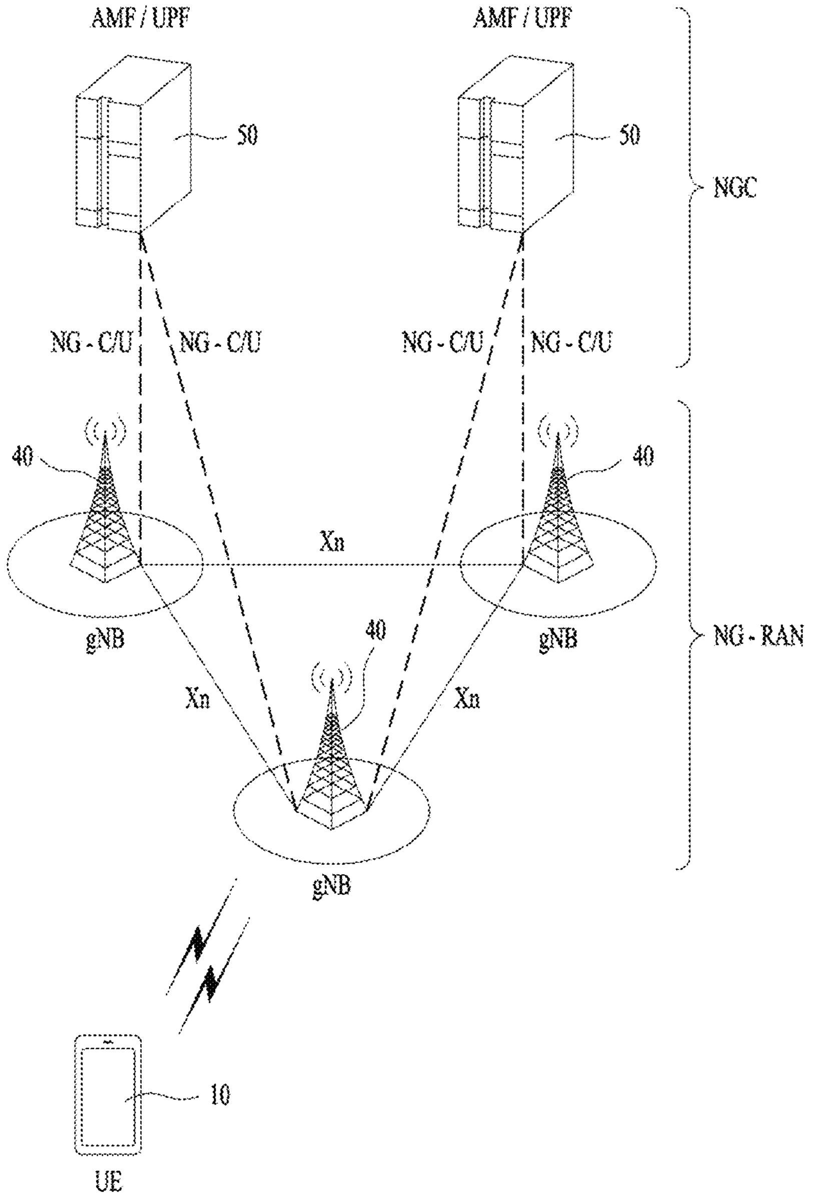
FIG. 2 illustrates the structure of an NR system to which embodiment(s) are applicable.

FIG. 2 illustrates the structure of a NR system.

Referring to FIG. 2, a next generation radio access network (NG-RAN) may include a next generation Node B (gNB) and/or an eNB, which provides user-plane and control-plane protocol termination to a UE. In FIG. 2, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
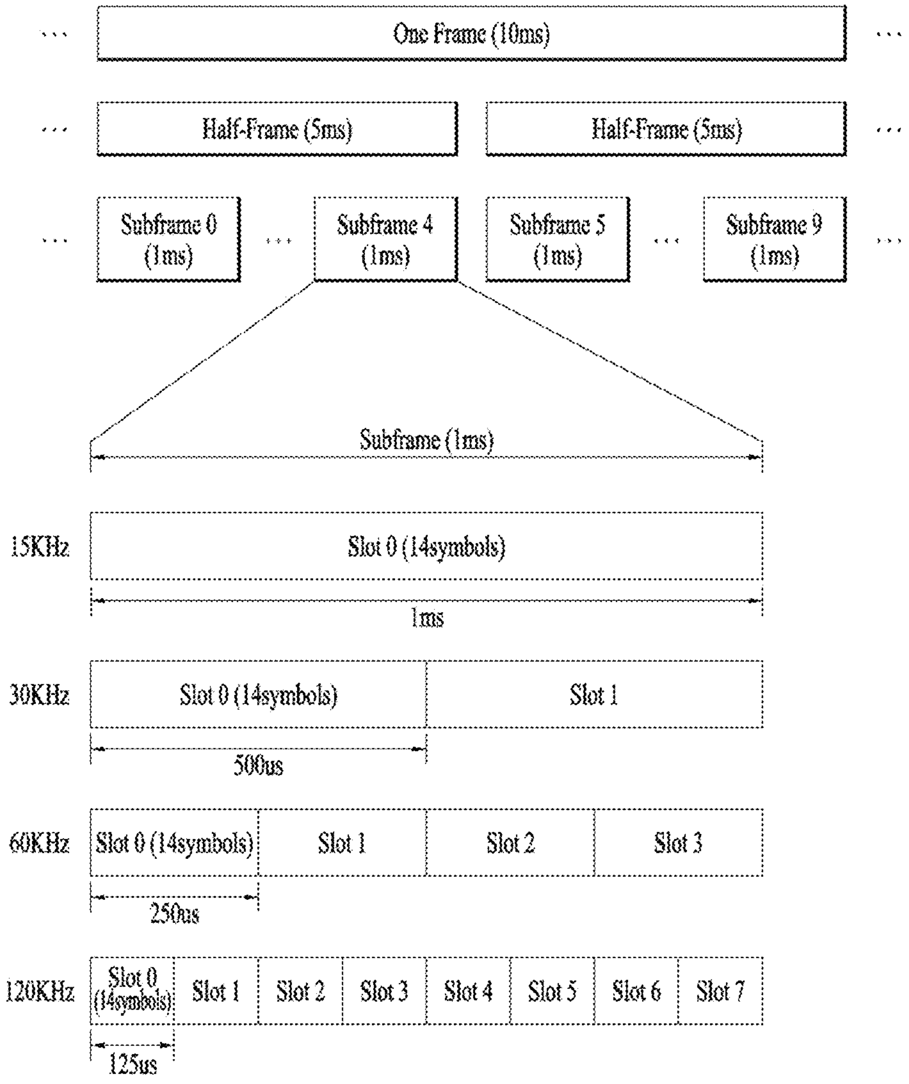
FIG. 3 illustrates the structure of an NR radio frame to which embodiment(s) are applicable.

FIG. 3 illustrates the structure of a NR radio frame to which the present disclosure is applicable.

Referring to FIG. 3, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM (A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame $N^{frame,u}_{slot}$, and the number of slots per subframe $N^{subframe,u}_{slot}$ according to an SCS configuration μ in the NCP case.

TABLE 1

| SCS ($15*2^u$) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM (A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description). In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHZ, 5900 MHz, 5925 MHZ, etc.) or higher. For example, the frequency band of 6 GHz (or 5850 MHZ, 5900 MHz, 5925 MHZ, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
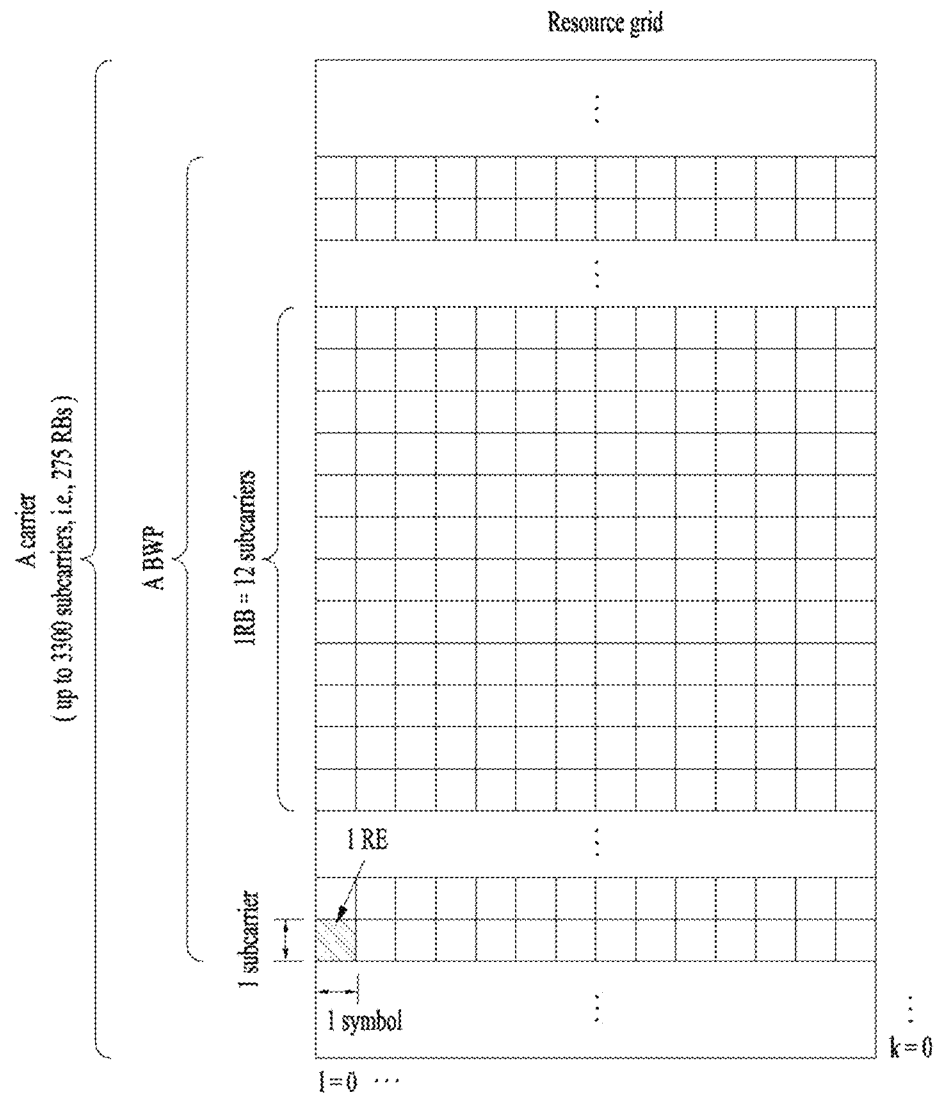
FIG. 4 illustrates the slot structure of an NR frame to which embodiment(s) are applicable.

FIG. 4 illustrates the slot structure of a NR frame.

Referring to FIG. 4, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Bandwidth Part (BWP)

In the NR system, up to 400 MHz may be supported per component carrier (CC). If a UE operating on a wideband CC always operates with the RF for the entire CCs turned on, the battery consumption of the UE may be increased. Alternatively, considering various use cases (e.g., eMBB, URLLC, Mmtc, V2X, etc.) operating within one wideband CC, different numerologies (e.g., sub-carrier spacings) may be supported for different frequency bands within a specific CC. Alternatively, the capability for the maximum bandwidth may differ among the UEs. In consideration of this, the BS may instruct the UE to operate only in a partial bandwidth, not the entire bandwidth of the wideband CC. The partial bandwidth is defined as a bandwidth part (BWP) for simplicity. Here, the BWP may be composed of resource blocks (RBs) contiguous on the frequency axis, and may correspond to one numerology (e.g., sub-carrier spacing, CP length, slot/mini-slot duration).

The BS may configure multiple BWPs in one CC configured for the UE. For example, a BWP occupying a relatively small frequency region may be configured in a PDCCH monitoring slot, and a PDSCH indicated by the PDCCH in a larger BWP may be scheduled. Alternatively, when UEs are concentrated in a specific BWP, some of the UEs may be configured in another BWP for load balancing. Alternatively, a spectrum in the middle of the entire bandwidth may be punctured and two BWPs on both sides may be configured in the same slot in consideration of frequency-domain inter-cell interference cancellation between neighbor cells. That is, the BS may configure at least one DL/UL BWP for the UE associated with the wideband CC and activate at least one DL/UL BWP among the configured DL/UL BWP(s) at a specific time (through L1 signaling, MAC CE or RRC signalling, etc.). The BS may instruct the UE to switch to another configured DL/UL BWP (through L1 signaling, MAC CE or RRC signalling, etc.). Alternatively, when a timer expires, the UE may switch to a predetermined DL/UL BWP. The activated DL/UL BWP is defined as an active DL/UL BWP. The UE may fail to receive DL/UL BWP configuration during an initial access procedure or before an RRC connection is set up. A DL/UL BWP assumed by the UE in this situation is defined as an initial active DL/UL BWP.

Figure 5:
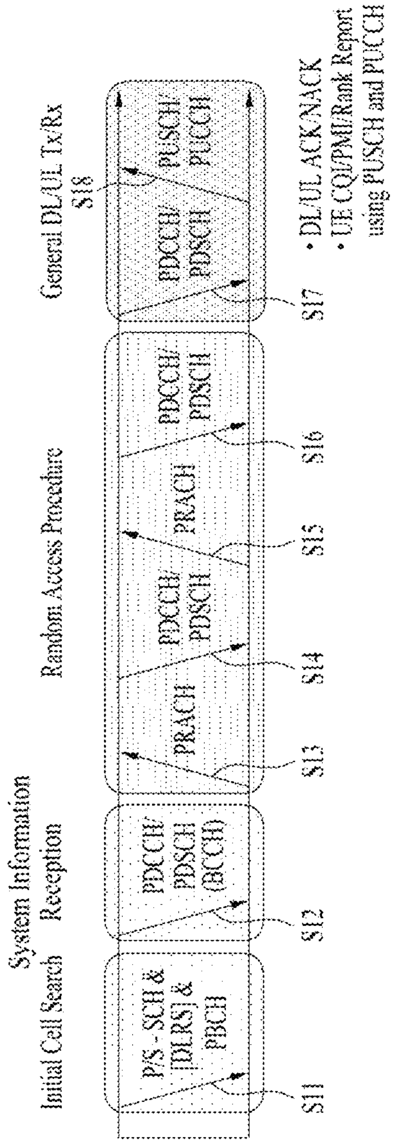
FIG. 5 is a diagram illustrating physical channels and a signal transmission method using the physical channels, which may be used in the embodiment.

FIG. 5 is a diagram illustrating physical channels and a signal transmission method using the physical channels, which may be used in various embodiments.

Referring to FIG. 5, when powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 6:
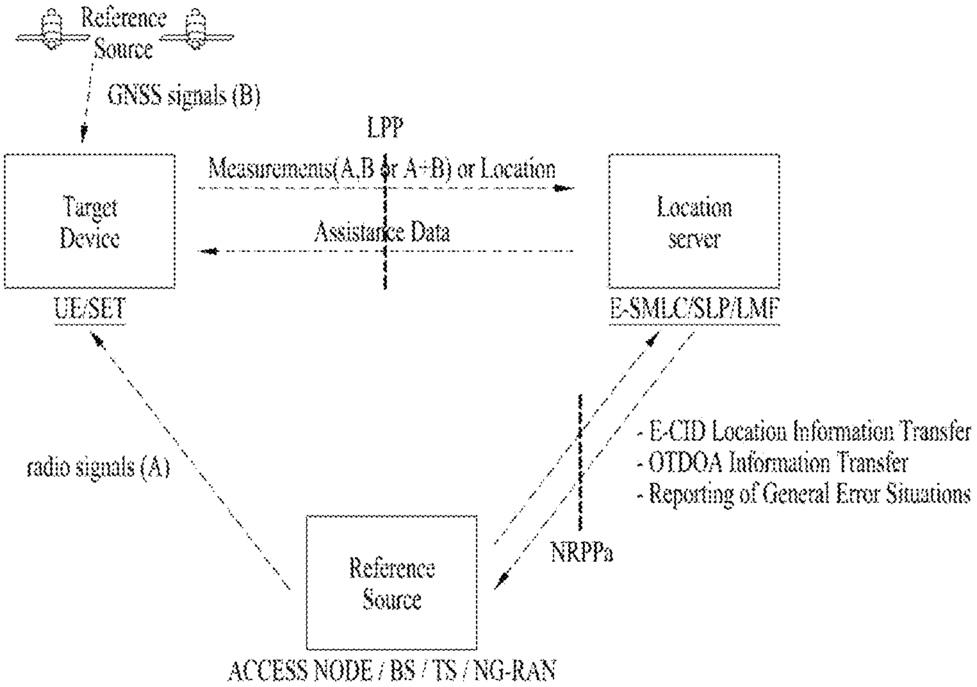
FIG. 6 is a diagram illustrating a positioning protocol configuration for positioning a user equipment (UE), to which various embodiments are applicable.

FIG. 6 is a diagram illustrating an exemplary positioning protocol configuration for positioning a UE, to which the embodiment is applicable.

Referring to FIG. 6, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

- E-CID Location Information Transfer. This function allows the reference source to exchange location information with the LMF for the purpose of E-CID positioning.
- OTDOA Information Transfer. This function allows the reference source to exchange information with the LMF for the purpose of OTDOA positioning.
- Reporting of General Error Situations. This function allows reporting of general error situations, for which function-specific error messages have not been defined.

Prs (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0,1, . . . ) may be defined by Equation 1.

$$r(m) = \frac{1}{\sqrt{2}}(1 - 2c(m)) + j\frac{1}{\sqrt{2}}(1 - 2c(m + 1)) \quad \text{[Equation 1]}$$

In Equation 1, c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}\left(N_{symb}^{slot}n_{s,f}^{\mu} + l + 1\right)\left(2\left(n_{ID,seq}^{PRS} \bmod 1024\right) + 1\right) + \left(n_{ID,seq}^{PRS} \bmod 1024\right)\right) \bmod 2^{31} \quad \text{[Equation 2]}$$

$$n_{s,f}^{\mu}$$

may be a slot number in a frame in an SCS configuration μ. A DL PRS sequence ID $$n_{ID,seq}^{PRS} \in \{0, 1, \ldots, 4095\}$$

may be given by a higher-layer parameter (e.g., DL-PRS-SequenceId). 1 may be an OFDM symbol in a slot to which the sequence is mapped.

Mapping to Physical Resources in a DL PRS Resource

A PRS sequence r(m) may be scaled by $\beta_{PRS}$ and mapped to REs $(k, l)_{p,\mu}$, specifically by Equation 3. $(k, l)_{p,\mu}$ may represent an RE(k, l) for an antenna port p and the SCS configuration μ.

$$a_{k,l}^{(p,\mu)} = \beta_{PRS} r(m) \quad \text{[Equation 3]}$$

$$m = 0, 1, \ldots$$

-continued $$k = mK_{comb}^{PRS} + \left(\left(k_{offset}^{PRS} + k'\right) \bmod K_{comb}^{PRS}\right)$$

$$l = l_{start}^{PRS}, l_{start}^{PRS} + 1, \ldots , l_{start}^{PRS} + L_{PRS} - 1$$

Herein, the following conditions may have to be satisfied:

The REs $(k, l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$$l_{start}^{PRS}$$

is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $$K_{comb}^{PRS} \in \{2, 4, 6, 12\}$$

may be given by a higher-layer parameter transmission-Comb. A combination $$\{l_{PRS}, K_{comb}^{PRS}\}$$

of $L_{PRS}$ and $$K_{comb}^{PRS}$$

may be one of {2, 2}, {4, 2}, {6, 2}, {12, 2}, {4, 4}, {12, 4}, {6, 6}, {12, 6} and/or {12, 12}. An RE offset $$k_{offset}^{PRS} \in \{0, 1, \ldots , K_{comb}^{PRS} - 1\}$$

may be given by combOffset. A frequency offset k' may be a function of $$l - l_{start}^{PRS}$$

as shown in Table 5.

TABLE 5

| | Symbol number within the downlink PRS resource $l - l_{start}^{PRS}$ | | | | | | | | | | | |
|---|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |

TABLE 5-continued

| | Symbol number within the downlink PRS resource $l - l_{start}^{PRS}$ | | | | | | | | | | | |
|---|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu} n_f + n_{s,f}^{\mu} - T_{offset}^{PRS} - T_{offset,res}^{PRS}\right) \bmod 2^{\mu} T_{per}^{PRS} \in \{iT_{gap}^{PRS}\}_{i=0}^{T_{rep}^{PRS}-1} \quad \text{[Equation 4]}$$

$$N_{slot}^{frame,\mu}$$

may be the number of slots per frame in the SCS configuration μ. $n_f$ may be a system frame number (SFN).

$$n_{s,f}^{\mu}$$

may be a slot number in a frame in the SCS=configuration μ. A slot offset $$T_{offset}^{PRS} \in \{0, 1, \ldots , T_{per}^{PRS} - 1\}$$

may be given by a higher-layer parameter DL-PRS-ResourceSetSlotOffset. A DL PRS resource slot offset $$T_{offset,res}^{PRS}$$

may be given by a higher layer parameter DL-PRS-ResourceSlotOffset. A periodicity $$T_{per}^{PRS} \in \{4, 5, 8, 10, 16, 20, 32, 40, 64, 80, 160, 320, 640, 1280, 2560, 5120, 10240\}$$

may be given by a higher-layer parameter DL-PRS-Periodicity. A repetition factor $$T_{rep}^{PRS} \in \{1, 2, 4, 6, 8, 16, 32\}$$

may be given by a higher-layer parameter DL-PRS-ResourceRepetitionFactor. A muting repetition factor $$T_{muting}^{PRS}$$

may be given by a higher-layer parameter DL-PRS-MutingBitRepetitionFactor. A time gap $$T_{gap}^{PRS} \in \{1, 2, 4, 8, 16, 32\}$$

may be given by a higher-layer parameter DL-PRS-ResourceTimeGap.

The PRS reception procedure of a terminal in an NR system to which various embodiments of the present disclosure are applicable may be based on Table 6 below.

TABLE 6

| |
|---|
| 5.1.6.5 PRS reception procedure<br>The UE can be configured with one or more DL PRS resource set configuration(s) as indicated by the higher layer parameters DL-PRS-ResourceSet and DL-PRS-Resource. Each DL PRS resource set consists of K ≥ 1 DL PRS resource(s) where each has an associated spatial transmission filter. The UE can be configured with one or more DL PRS Positioning Frequency Layer configuration(s) as indicated by the higher layer parameter DL-PRS-PositioningFrequencyLayer. A DL PRS Positioning Frequency Layer is defined as a collection of DL PRS Resource Sets which have common parameters configured by DL-PRS-PositioningFrequencyLayer.<br>The UE assumes that the following parameters for each DL PRS resource(s) are configured via higher layer parameters DL-PRS-PositioningFrequencyLayer, DL-PRS-ResourceSet and DL-PRS-Resource.<br>A positioning frequency layer consists of one or more PRS resource sets and it is defined by:<br>DL-PRS-SubcarrierSpacing defines the subcarrier spacing for the DL PRS resource. All DL PRS Resources and DL PRS Resource sets in the same DL-PRS-PositioningFrequencyLayer have the same value of DL-PRS-SubcarrierSpacing. The supported values of DL-PRS-SubcarrierSpacing are given in Table 4.2-1 of [4, TS38.211].<br>DL-PRS-CyclicPrefix defines the cyclic prefix for the DL PRS resource. All DL PRS Resources and DL PRS Resource sets in the same DL-PRS-PositioningFrequencyLayer have the same value of DL-PRS-CyclicPrefix. The supported values of DL-PRS-CyclicPrefix are given in Table 4.2-1 of [4, TS38.211].<br>DL-PRS-PointA defines the absolute frequency of the reference resource block. Its lowest subcarrier is also known as Point A. All DL PRS resources belonging to the same DL PRS Resource Set have common Point A and all DL PRS Resources sets belonging to the same DL-PRS-PositioningFrequencyLayer have a common Point A.<br>The UE expects that it will be configured with [IDs] each of which is defined such that it is associated with multiple DL PRS Resource Sets from the same cell. The UE expects that one of these [IDs] along with a DL-PRS-ResourceSetId and a DL-PRS-ResourceId can be used to uniquely identify a DL PRS Resource.<br>A PRS resource set consists of one or more PRS resources and it is defined by:<br>DL-PRS-ResourceSetId defines the identity of the DL PRS resource set configuration.<br>DL-PRS-Periodicity defines the DL PRS resource periodicity and takes values $T_{per}^{PRS} \in \{4, 8, 16, 32, 64, 5, 10, 20, 40, 80, 160, 320, 640, 1280, 2560, 5120, 10240, 20480\}$ slots, where $\mu = 0, 1, 2, 3$ for DL-PRS-SubcarrierSpacing = 15, 30, 60 and 120 kHz respectively. $T_{per}^{PRS} = 2^{\mu} \cdot 20480$ is not supported for $\mu = 0$. All the DL PRS resources within one resource set are configured with the same periodicity.<br>DL-PRS-ResourceRepetitionFactor defines how many times each DL-PRS resource is repeated for a single instance of the DL-PRS resource set and takes values $T_{per}^{PRS} \in \{1, 2, 4, 6, 8, 16, 32\}$,. All the DL PRS resources within one resource set have the same ResourceRepetitionFactor<br>DL-PRS-ResourceTimeGap defines the offset in number of slots between two repeated instances of a DL PRS resource with the same DL-PRS-ResourceID within a single instance of the DL PRS resource set and takes values $T_{gap}^{PRS} \in \{1, 2, 4, 8, 16, 32\}$. |

TABLE 6-continued

The UE only expects to be configured with DL-PRS-ResourceTimeGap if DL-PRS-ResourceRepetitionFactor is configured with value greater than 1. The time duration spanned by one instance of a DL-PRS-ResourceSet is not expected to exceed the configured value of DL-PRS-Periodicity. All the DL PRS resources within one resource set have the same DL-PRS-ResourceTimeGap.

DL-PRS-MutingPattern defines a bitmap of the time locations where the DL PRS resource is expected to not be transmitted for a DL PRS resource set. The bitmap size can be {2, 4, 8, 16, 32} bits long. The bitmap has two options for applicability. In the first option each bit in the bitmap corresponds to a configurable number of consecutive instances of a DL-PRS-ResourceSet where all the DL-PRS-Resources within the set are muted for the instance that is indicated to be muted. In the second option each bit in the bitmap corresponds to a single repetition index for each of the DL-PRS-Resources within each instance of a DL-PRS-ResourceSet and the length of the bitmap is equal to DL-PRS-ResourceRepetitionFactor. Both options may be configured at the same time in which case the logical AND operation is applied to the bit maps as described in clause 7.4.1.7.4 of [4, TS 38.211].

in a higher layer parameter DL-PRS-RstdReferenceInfo. The reference time indicated by the network to the UE can also be used by the UE to determine how to apply higher layer parameters DL-PRS-expectedRSTD and DL-PRS-expectedRSTD-uncertainty. The UE expects the reference time to be indicated whenever it is expected to receive the DL PRS. This reference time provided by DL-PRS-RstdReferenceInfo may include an [ID], a PRS resource set ID, and optionally a single PRS resource ID or a list of PRS resource IDs. The UE may use different DL PRS resources or a different DL PRS resource set to determine the reference time for the RSTD measurement as long as the condition that the DL PRS resources used belong to a single DL PRS resource set is met. If the UE chooses to use a different reference time than indicated by the network, then it is expected to report the DL PRS resource ID(s) or the DL PRS resource set ID used to determine the reference.

The UE may be configured to report quality metrics corresponding to the RSTD and UE Rx-Tx time difference measurements which include the following fields:

TimingMeasQuality-Value which provides the best estimate of the uncertainty of the measurement TimingMeasQuality-Resolution which specifies the resolution levels used in the Value field The UE expects to be configured with higher layer parameter DL-PRS-expectedRSTD, which defines the time difference with respect to the received DL subframe timing the UE is expected to receive DL PRS, and DL-PRS-expectedRSTD-uncertainty, which defines a search window around the expectedRSTD.

For DL UE positioning measurement reporting in higher layer parameters DL-PRS-RstdMeasurementInfo or DL-PRS-UE-Rx-Tx-MeasurementInfo the UE can be configured to report the DL PRS resource ID(s) or the DL PRS resource set ID(s) associated with the DL PRS resource(s) or the DL PRS resource set(s) which are used in determining the UE measurements DL RSTD, UE Tx-Rx time difference or the DL PRS-RSRP.

The UE can be configured in higher layer parameter UE Rx-Tx Time-MeasRequestInfo to report multiple UE Rx-Tx time difference measurements corresponding to a single configured SRS resource or resource set for positioning. Each measurement corresponds to a single received DL PRS resource or resource set which can be in difference positioning frequency layers.

For the DL RSTD, DL PRS-RSRP, and UE Rx-Tx time difference measurements the UE can report an associated higher layer parameter Timestamp. The Timestamp can include the SFN and the slot number for a subcarrier spacing. These values correspond to the reference which is provided by DL-PRS-RSTDReferenceInfo.

The UE is expected to measure the DL PRS resource outside the active DL BWP or with a numerology different from the numerology of the active DL BWP if the measurement is made during a configured measurement gap. When not configured with a measurement gap, the UE is only required to measure DL PRS within the active DL BWP and with the same numerology as the active DL BWP. If the UE is not provided with a measurement gap, the UE is not expected to process DL PRS resources on serving or non-serving cells on any symbols indicated as UL by the serving cell. When the UE is expected to measure the DL PRS resource outside the active DL BWP it may request a measurement gap in higher layer parameter [XYZ].

The UE assumes that for the serving cell the DL PRS is not mapped to any symbol that contains SS/PBCH. If the time frequency location of the SS/PBCH block transmissions from non-serving cells are provided to the UE then the UE also assumes that the DL PRS is not mapped to any symbol that contains the SS/PBCH block of the non-serving cell.

The UE may be configured to report, subject to UE capability, up to 4 DL RSTD measurements per pair of cells with each measurement between a different pair of DL PRS resources or DL PRS resource sets within the DL PRS configured for those cells. The up to 4 measurements being performed on the same pair of cells and all DL RSTD measurements in the same report use a single reference timing.

The UE may be configured to measure and report up to 8 DL PRS RSRP measurements on different DL PRS resources from the same cell. When the UE reports DL PRS RSRP measurements from one DL PRS resource set, the UE may indicate which DL PRS RSRP measurements have been performed using the same spatial domain filter for reception.

If the UE is configured with DL-PRS-QCL-Info and the QCL relation is between two DL PRS resources, then the UE assumes those DL PRS resources are from the same cell. If TABLE 6-continued

| |
|---|
| DL-PRS-QCL-Info is configured to the UE with 'QCL-Type-D' with a source DL-PRS-Resource then the DL-PRS-ResourceSetId and the DL-PRS-Resrouceld of the source DL-PRS-Resource are expected to be indicated to the UE. |
| The UE does not expect to process the DL PRS in the same symbol where other DL signals and channels are transmitted to the UE when there is no measurement gap configured to the UE. |

UE Positioning Architecture

Figure 7:
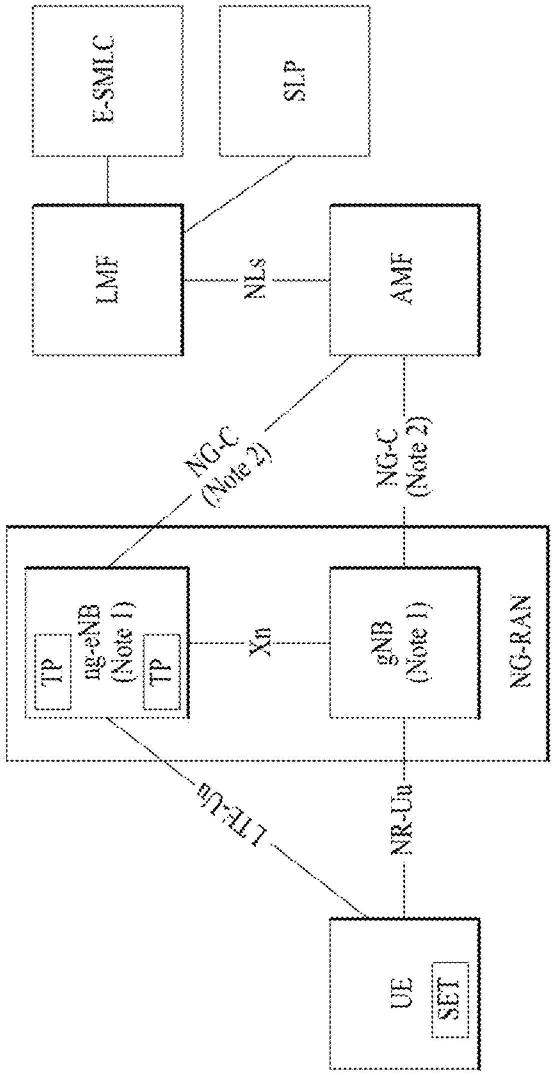
FIG. 7 illustrates an exemplary system architecture for measuring positioning of a UE to which various embodiments are applicable.

FIG. 7 illustrates an exemplary system architecture for measuring positioning of a UE to which the embodiment is applicable.

Referring to FIG. 7, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QOS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

Figure 8:
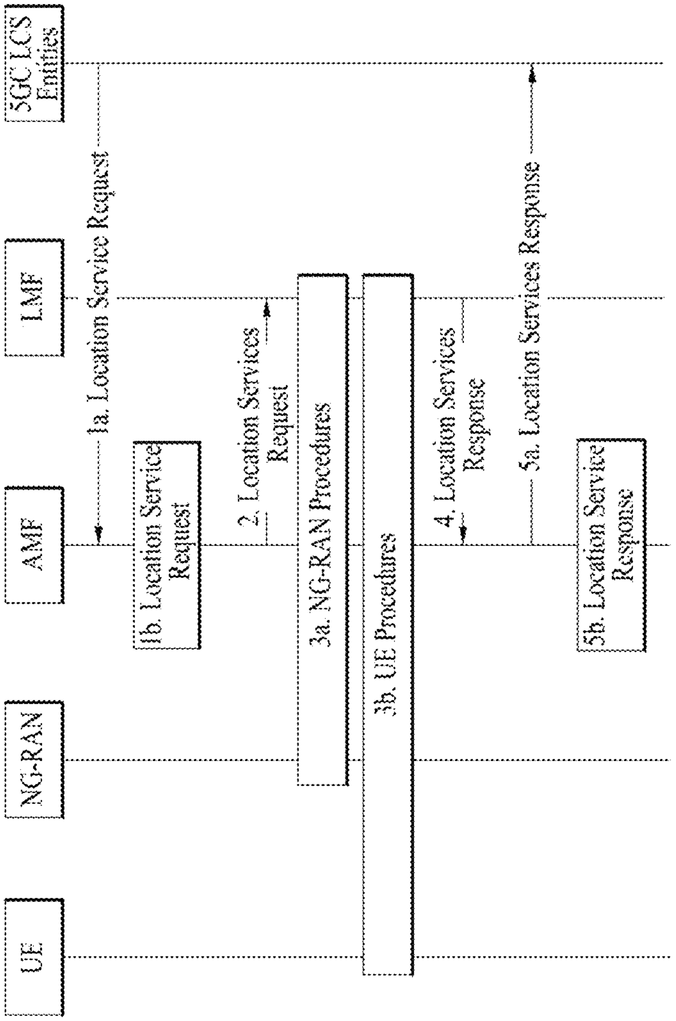
FIG. 8 illustrates an implementation example of a network for UE positioning.

FIG. 8 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 8. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3*b*, when information or requests exchanged between the LMF and the UE are erroneous, an error message may be transmitted and received and an abort message for aborting positioning may be transmitted and received.

Protocol used in step 3*b* may be an LPP protocol which will be described later.

Step 3*b* may be performed additionally after step 3*a* but may be performed instead of step 3*a*.

In step 4, the LMF may provide a location service response to the AMF. The location service response may include information as to whether UE positioning is successful and include a location estimate value of the UE. If the procedure of FIG. 8 has been initiated by step 1*a*, the AMF may transfer the location service response to a 5GC entity such as a GMLC. If the procedure of FIG. 9 has been initiated by step 1*b*, the AMF may use the location service response in order to provide a location service related to an emergency call.

Positioning Protocol

LTE Positioning Protocol (LPP)

Figure 9:
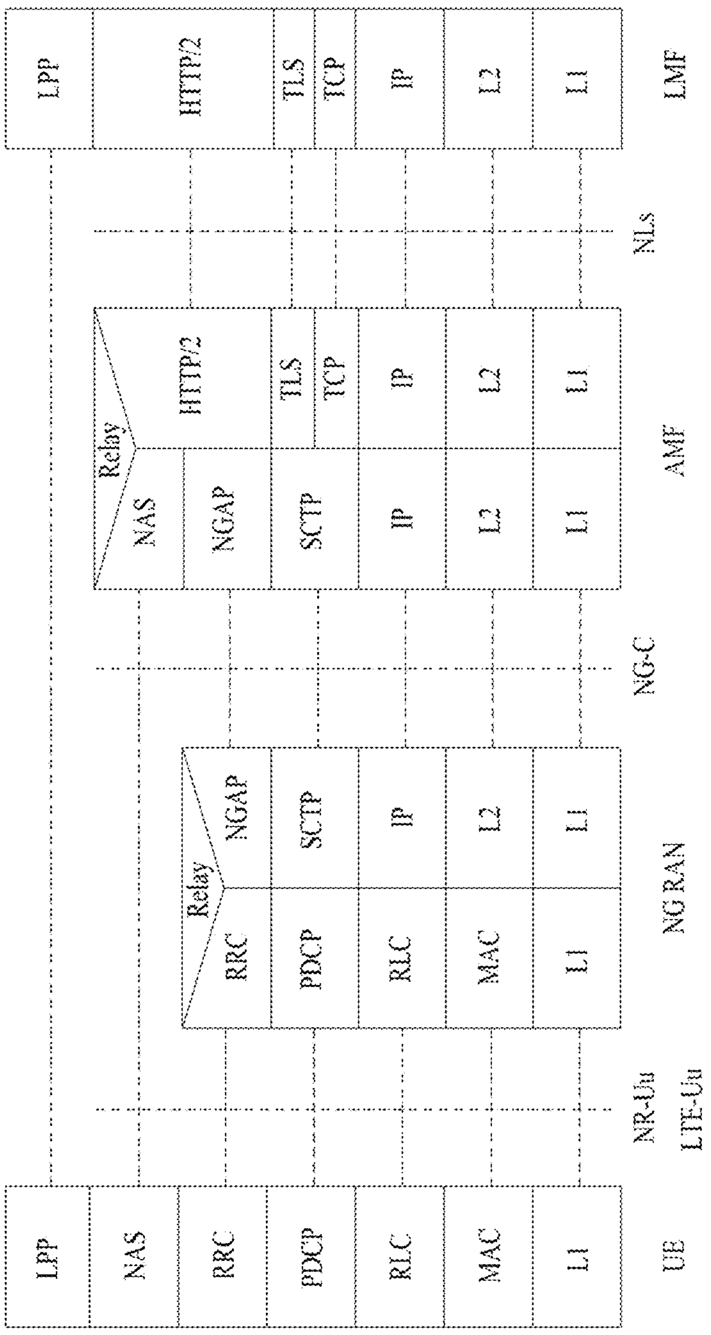
FIG. 9 is a diagram illustrating protocol layers for supporting LTE positioning protocol (LPP) message transmission, to which various embodiments are applicable.

FIG. 9 illustrates an exemplary protocol layer used to support LPP message transfer between an LMF and a UE. An LPP protocol data unit (PDU) may be carried in a NAS PDU between an AMF and the UE.

Referring to FIG. 9, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 10:
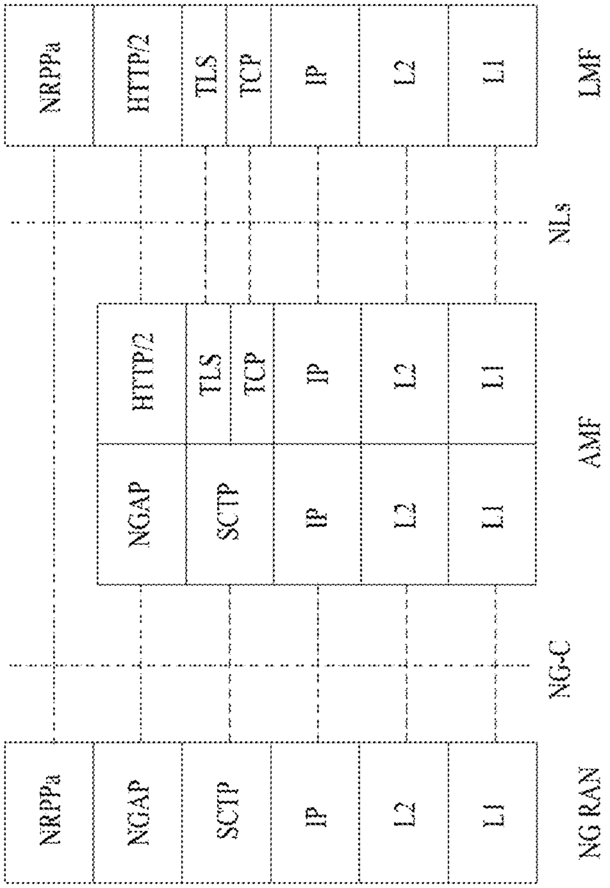
FIG. 10 is a diagram illustrating protocol layers for supporting NR positioning protocol a (NRPPa) protocol data unit (PDU) transmission, to which various embodiments are applicable.

FIG. 10 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference of Arrival)

Figure 11:
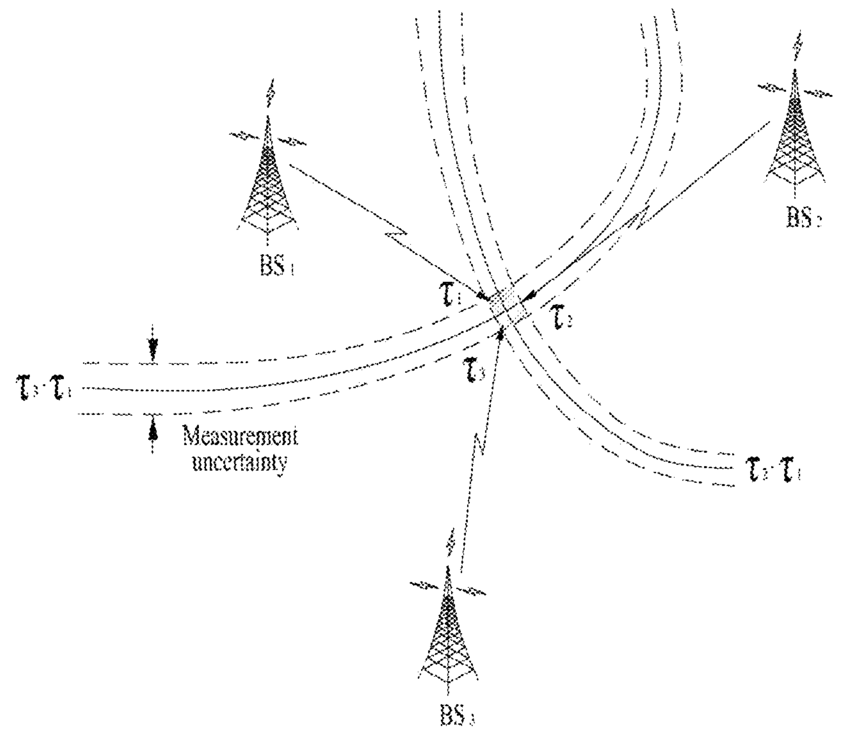
FIG. 11 is a diagram illustrating an observed time difference of arrival (OTDOA) positioning method, to which various embodiments are applicable.

FIG. 11 is a diagram illustrating an observed time difference of arrival (OTDOA) positioning method, to which the embodiment is applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 5]}$$

In Equation 5, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i\text{-}T_1)$ is a transmission time offset between two TPs, referred to as "real time differences" (RTDs), and $n_i$ and $n_1$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance (TADV), and/or AoA Here, TADV may be divided into Type 1 and Type 2 as follows.

$T_{ADV}$ Type 1=(ng-eNB Rx-Tx time difference)+(UE E-UTRA Rx-Tx time difference)

TADV Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

CPM (Carrier Phase Measurement)

Carrier phase measurement (CPM) is one of the position estimation algorithms used in the GPS/GNSS. In brief, the CPM is a scheme of estimating the distance between a transmitter and receiver by measuring the phase of a received transmission signal and determining the position based on the estimated distance. In other words, the position of the user may be measured by calculating the distance to each of the multiple satellites based on signals received from the multiple satellites. In this case, it is assumed that there is a Line of Sight (LoS) between the satellite and the user, and based on this assumption, the time difference between the transmitter and receiver may be translated into the distance between the transmitter and receiver. Meanwhile, satellite channels may experience multi-path and delays due to the ionosphere, but the multi-path and delays caused by the ionosphere may be mitigated through modeling.

Table 7 below shows the matters discussed in relation to (3GPP) CPM in a specific scenario.

TABLE 7

| |
|---|
| Justification<br>Regarding higher accuracy, two promising techniques identified in earlier studies will be considered in Rel-18: one is to take the advantage of the rich 5G spectrum to increase the bandwidth for the transmission and reception of the positioning reference signals based on PRS/SRS bandwidth aggregation for intra-band carriers, and the other is to use the NR carrier phase measurements. GNSS carrier phase positioning has been used very successfully for centimetre-level positioning but is limited to outdoor applications. NR carrier phase positioning has the potential for significant performance improvements for indoor and outdoor deployments in comparison with the existing NR positioning methods, as well as shorter latency and lower UE power consumption in comparison with RTK-GNSS outdoors.<br>Objective<br>• Improved accuracy, integrity, and power efficiency:<br>○ Study solutions for Integrity for RAT dependent positioning techniques [RAN2, RAN1]:<br>■ Identify the error sources, [RAN1, RAN2].<br>■ Study methodologies, procedures, signalling, etc for determination of positioning integrity for both UE-based and UE-assisted positioning [RAN2]<br>■ Focus on reuse of concepts and principles being developed for RAT-Independent GNSS positioning integrity, where possible.<br>○ Study solutions for accuracy improvement based on PRS/SRS bandwidth aggregation for intra-band carriers considering e.g. timing errors, phase coherency, frequency errors, power imbalance, etc [RAN4]:<br>○ Study solutions for accuracy improvement based on NR carrier phase measurements [RAN1, RAN4]<br>■ Reference signals, physical layer measurements, physical layer procedures to enable positioning based on NR carrier phase measurements for both UE-based and UE-assisted positioning [RAN1]<br>■ Focus on reuse of existing PRS and SRS, with new reference signals only considered if found necessary<br>○ Study the requirements on LPHAP as developed by SA1 and evaluate whether existing RAN functionality can support these power consumption and positioning requirements. Based on the evaluation, and, if found beneficial, study potential enhancements to help address any limitations [RAN2, RAN1]<br>■ Study is limited to a single representati LPHAP<br>■ ve use case (use case 6 as defined TS 22.104). The choice of selected use case can be reviewed at the start of the study.<br>Study is limited to enhancements to RRC_INACTIVE and/or RRC_IDLE state |

The aforementioned CPM may be compared to code phase measurement. While the code phase measurement is commonly used, in GPS/GNSS-related positioning, the actual phase of a carrier may be directly measured. Typically, the CPM provides higher accuracy than the code phase measurement because the CPM directly measures the phase within a cycle corresponding to the carrier frequency. Meanwhile, the CPM and code phase measurement may be performed based on similar or identical algorithms or methods.

In the CPM, the following fundamental positioning principle may be used: the transmitter transmits a predetermined signal at a specific time, and the receiver measures the exact reception time at the carrier phase level (i.e., within the cycle of the carrier frequency). In this case, the distance between the transmitter and receiver may be measured very accurately based on the CPM. To use such a method, the distance is typically converted into a phase, and a pseudo-range equation may be derived based on the conversion. As CPM positioning based on the pseudo-range equation, positioning based on GNSS/GPS may be performed by applying Equation 6 below.

$$p=\rho+d_p+c(dt-dT)+d_{ion}+d_{trop}+e_{mp}+e_p \qquad \text{[Equation 6]}$$

In Equation 6, p denotes pseudo-range measurement, ρ denotes the true range, $d_p$ denotes satellite orbital errors, c denotes the speed of light, dt denotes the satellite clock offset from GPS time, dT denotes the receiver clock offset from GPS time, $d_{ion}$ denotes the ionospheric delay, $d_{trop}$ denotes the tropospheric delay, $e_{mp}$ denotes the multi-path effect, and $e_p$ denotes the receiver noise.

These terms may be considered in the GPS/GNSS, and there are techniques to mitigate or remove each term. Additionally, although it is not explicitly represented in Equation 6, the carrier phase information that the user may estimate is within a range of [0, 2π]. For distances exceeding the range, a separate estimation method is needed. In other words, when the actual distance between the user and the satellite is converted into a phase, the receiver needs to estimate the distance corresponding to an integer multiple of the frequency cycle through a separate estimation method (integer ambiguity resolution).

Differencing

Positioning using CPM in the GNSS/GPS may also consider the following factors. Specifically, a cycle slip may occur at the receiver, which may require reporting or correction therefor. The cycle slip may occur when the receiver is incapable of tracking a signal beyond a specific threshold (e.g., a half-cycle). When such a cycle slip occurs, the measurement of the corresponding epoch from the transmitter may become invalid. After the cycle slip, measurements may be reused, but the integer ambiguity needs to be re-estimated.

Additionally, the issue of position dilution (dilution of precision) may also arise. The position dilution means that even when positioning is performed based on the same number of transmitters and receivers and with the same signal-to-noise ratio (SNR), the accuracy of the positioning may vary depending on the relative positions (or distances) between the transmitter and receiver, which is often referred to as geometric dilution of precision (GDOP). For example, when a receiver calculates the position based on signals from N transmitters, the positioning accuracy of the receiver may be lower if the transmitters are closely grouped, compared to when the transmitters are more evenly distributed.

Integer Ambiguity Resolution

First, the following may be considered as solutions related to integer ambiguity resolution (refer to Lee, Hongkyu (2014). "An Instantaneous Integer Ambiguity Resolution for GPS Real-Time Structure Monitoring," Journal of Korean Society of Civil Engineers, Vol. 34, No. 1, pp. 342-353 (in Korean)).

In dynamic positioning using GPS carriers, centimeter-level accuracy may be achieved through precise determination of unknown integer ambiguity contained in observation data. To this end, ambiguity resolution, which is a mathematical procedure for converting ambiguous range observation data with uncertainty into a precise range with millimeter-level accuracy, is necessary. For GPS dynamic positioning, it is common to apply the integer-constrained least squares (Teunissen, 1994; Han et al., 1997; Verhagen, 2004).

However, when the receiver is moving, there is a limitation on observation data capable of being used in the mathematical model compared to when the receiver is stationary, resulting in lower estimation precision and higher correlation, which makes it difficult to quickly and accurately resolve the integer ambiguity (Teunissen, 1993; Lee et al., 2005). Therefore, in GPS dynamic positioning, it is common to use the on-the-fly (OTF) method, which extracts and accumulates only the integer ambiguity part of a normal equation. The time required for initializing the integer ambiguity may range from several seconds to several minutes, depending on the satellite geometry and residual errors (Hofmann-Wellenhof et al., 2001). This method depends on the previously determined integer ambiguity after initialization as long as there are no signal interruptions (cycle slips). In this method, when initialization is required, it is not possible to perform high-precision positioning during the initialization period. Additionally, recalculation of the integer ambiguity is required due to changes in the satellite geometry, and continuous monitoring for signal interruptions is necessary, which makes the algorithm inherently complex.

In the mid-1990s, with the emergence of dual-frequency receivers capable of observing a precise pseudo-range, instantaneous ambiguity resolution has been developed for baselines of around 10 km (Han et al., 1996). This method independently resolves the integer ambiguity for each epoch whenever the GPS receiver acquires both the carrier phase and precise pseudo-range. Since the method does not require additional algorithms for checking the signal interruption or satellite geometry, the method is suitable for GPS structural monitoring environments where such interruptions frequently occur due to the structure or passing vehicles. However, the performance of the instantaneous ambiguity resolution is significantly affected by the satellite geometry and residual errors. Particularly, when fewer than five satellites are observed or when multi-path effects become significant, the performance thereof degrades (Lee et al., 2004).

There are a variety of algorithms for performing integer ambiguity resolution, and one of the most well-known and effective methods is least squares ambiguity decorrelation adjustment (LAMBDA). To use the LAMBDA, the float estimate of the position, i.e., the positioning within the cycle should be separated from the integer ambiguity. Since the integer ambiguity is an integer rather than a floating point value, the obtained float solution is not the exact solution and may be further refined. The ellipsoid formed by the covariance of the integer ambiguity becomes extremely elongated in one direction, and as a result, searching within this space is inefficient. Therefore, the LAMBDA transforms the system with the elongated ellipsoid to a system closer to a sphere, which is more efficient than previous methods in searching for solutions to the integer ambiguity.

Another method for estimating integer ambiguity involves using both CPM and code phase measurement at each epoch. The downside of this method is that a time slew value is required to obtain the correlation between the CPM and code phase measurement, and GPS outputs at 1 Hz from the Novatel Superstar II. A brief summary thereof is that the measurement for a single epoch and the covariance of the integer ambiguity from the previous epoch are used. The reason for using the covariance from the previous epoch is that when the receiver maintains phase lock on the carrier phase, the integer ambiguity remains constant across the two epochs. In addition, there are other algorithms for estimating integer ambiguity such as algorithms based on the extended Kalman filter, and there are many variations.

CPM in NR

The aforementioned CPM in the GPS/GNSS may be based on a single carrier. Specifically, in the CPM, the phase may be estimated based on the transmission and reception of sinusoidal signals, rather than in the code domain. The CPM between a satellite and user in the GPS/GNSS may be introduced to the gNB (or TRP) and UE in NR. In the introduction thereof to NR, there may be the following differences. Unless the sinusoidal signal is redefined as a reference signal, OFDM-based CPM should be performed. In other words, the OFDM-based CPM differs from GPS/GNSS-based CPM in that the OFDM-based CPM is performed on relatively wideband signals.

First, the current reference signal for positioning in NR is a PRS. If a sinusoidal signal is redefined based on the PRS, the sinusoidal signal may have the configuration characteristics of the PRS. That is, the bandwidth (BW) configuration for the sinusoidal signal may be more flexible. Additionally, the probability of having a LoS path between the BS (or TRP) and the user may be lower than the probability of having a LoS path between the satellite and the user. In other words, since the multi-path effects between the BS (or TRP) and the user are incapable of being ignored, the CPM in NR should also consider the effects of multi-path between the BS (or TRP) and the user. In the CPM in NR, non-line of sight (NLOS) elimination or LOS path estimation may be treated with greater importance from the perspective of algorithms. Additionally, compared to the GPS, NR typically has higher carrier frequencies, larger BWs, and stricter latency requirements. Consequently, in the CPM in NR, the time required to resolve integer ambiguity needs to be further reduced.

Solutions may be needed to address issues related to user positioning based on the CPM using the PRS in NR. Since the PRS is a reference signal with a BW, there should be a common understanding between the higher layers and the UE regarding which frequency within a given PRS is used for phase measurement. In contrast, existing NR positioning methods (e.g., OTDOA, AoA, AoD, etc.) do not require specifying or indicating specific frequency resources. However, in CPM-based positioning using the PRS, an additional operation of specifying or reporting a specific frequency may be required.

CPM Positioning Method Using PRS

As described above, performing CPM may be interpreted to mean that the UE measures the phase of a designated reference signal and reports the measured phase, and the gNB (or location server) determines the location based on the report. Alternatively, performing CPM may mean that the UE determines the location thereof based on the measured phase. Additionally, performing CPM may mean that the UE is responsible for both transmitting and receiving the reference signal to measure the phase. In this case, the reporting process may vary depending on UE capabilities related to CPM. Hereinafter, UE capabilities for CPM and specific UE reporting operations for CPM, which depends on the UE capabilities, will be described in detail.

Specifically, in "Section 1," UE capabilities related to measurement accuracy and UE reporting based thereon will be described. In "Section 2," multiple measurement capabilities will be described. In "Section 3," error capabilities will be described. Based on the capabilities described below, the gNB (or location server) may consider configuring CPM configurations depending on the UE capabilities, or the UE may expect to receive reporting instructions based on the UE capabilities.

Hereinafter, the CPM is defined as carrier phase positioning (CPP).

1. Capability Regarding Measurement Accuracy

As UE capability information, a capability related phase measurement accuracy may be defined. In this case, even if the UE is capable of performing only phase measurement on a designated/agreed reference signal for CPP, time-domain phase estimation accuracy may be required for resolving and eliminating integer ambiguity (or for removing NLOS components and/or estimating a LOS path). Therefore, capability information related to phase measurement in the time domain may be considered. The capability information or capability described below refers to the actual capabilities of the UE and may be included in the UE capability report. However, the capability information or capability may also be provided as assistance information to the gNB (or location server), (depending on preferences). Additionally, the capability or assistance information described below may be reported for each of the following options. Alternatively, all or some of the capabilities presented in the options may be reported together as a single piece of capability or assistance information to the gNB (or location server). In other words, ensuring the accuracy of CPP through the resolution of integer ambiguity is crucial, and therefore, it may be necessary to report the capability to estimate a LOS in relation to CPP.

(1) Scenario 1: UE Capability Based on Time-Domain Granularity and/or Sampling Rate The LOS estimation performance of the UE may ultimately be determined by how well the UE is capable of estimating a channel impulse response. This means that the LOS estimation performance of the UE may be considered to be dependent on the sampling rate in the time domain. Therefore, the UE may report capability information on the LOS estimation capability as the phase estimation/measurement capability thereof. In this case, the LOS estimation capability may be determined based on the time-domain granularity and/or sampling rate of the UE. Alternatively, the UE may report, as the capability related to phase estimation/measurement, a UE capability regarding the minimum unit of the time-domain granularity/sampling rate. Here, the time-domain granularity/sampling rate refers to the minimum unit of time that the UE is capable of estimating for a received signal on the time axis. The time-domain granularity/sampling rate may not correspond directly to the actual implementation of the UE but may rather indicate the minimum unit the UE reports for signal processing purposes. The time-domain granularity/sampling rate may be applied not only to CPP but also to all positioning techniques, or the time-domain granularity/sampling rate may be a capability required only for CPP. In other words, the time-domain granularity/sampling rate refers to a UE capability that the UE reports to the gNB (or location server) for positioning such as CPP. The UE capability regarding the time-domain granularity/sampling rate may be considered in conjunction with the following options. Reporting the time-domain granularity/sampling rate, which will be described below, may either be reporting a granularity based on predefined/pre-agreed granularities or reporting the actual granularity value. In the former case, one of the predefined granularities, such as x1, x2, or x3 (ns), may be reported.

As described above, the LOS estimation capability is a capability determined based on the time-domain granularity/sampling rate, which may be defined as the configuration of the time-domain granularity/sampling rate. For example, the LOS estimation capability may have a larger value as the time-domain granularity becomes lower or the sampling rate in the time domain becomes higher. The UE may report the LOS estimation capability determined based on the time-domain granularity/sampling rate or report the time-domain granularity/sampling rate itself as the LOS estimation capability.

Option 1-1: Capability for Time-Domain Granularity/Sampling Rate Based on BW/SCS The UE may report capability information on different time-domain granularities/sampling rates (or different LOS estimation capabilities) depending on the BW and/or SCS. The capability reporting based on the BW and/or SCS may be provided for each BW and/or SCS expected to be configured by the gNB (or location server) (alternatively, the UE may report different capabilities depending on the BW and/or SCS). In other words, the UE may report capability information that includes the time-domain granularity/sampling rate for each BW and/or SCS that may be configured. For example, the UE may report a time-domain granularity/sampling rate applied to SCSs less than 30 kHz, a time-domain granularity/sampling rate applied to SCSs more than or equal to 30 kHz and less than 60 kHz, and a time-domain granularity/sampling rate applied to SCSs more than 60 kHz.

Option 1-2: Capability for Time-Domain Granularity/Sampling Rate Based on Frequency The UE may report capabilities (or LOS estimation capabilities) for different time-domain granularities/sampling rates depending on the frequency. Here, the frequency may refer to actual operational frequency bands. For example, the UE may report capability information on time-domain granularities/sampling rates distinguished by frequency ranges such as FRI and FR2. Alternatively, the UE may report capabilities in a band-specific manner. The UE may also report capability information on the time-domain granularity/sampling rate for each frequency band expected to be configured by the gNB (or location server) (alternatively, the UE may report different capabilities depending on the band). Alternatively, the UE may report capability information on the time-domain granularity/sampling rate for each frequency layer provided in the PRS configuration. In other words, the UE may report capability information on the time-domain granularity/sampling rate for each frequency layer expected to be configured by the gNB (or location server).

Option 1-3: Reporting Capability for Time-Domain Granularity/Sampling Rate Based on Number of Measurements Capable of being Performed Simultaneously The UE may report capabilities for different time-domain granularities/sampling rates (or different LOS estimation capabilities) based on the number of carriers or frequencies capable of being measured simultaneously. Here, the number of simultaneous measurements may refer to the number of PRSs that may be phase-measured within a certain time duration in the time domain and/or the number of satellite measurements that may be included in a single measurement report from the UE. In this case, the UE may report the capability for a time-domain granularity/sampling rate for each number of simultaneous measurements. For example, the UE may report in the format of (1, X1 ns), (2, X2 ns), (3, X3 ns), where 1, 2, and 3 represent the number of simultaneous measurements, and X1, X2, and X3 represent the capabilities for time-domain granularities/sampling rates.

Option 1-4: Reporting Whether Capability for (Specific) Time-Domain Granularity/Sampling Rate Meets or Exceeds Specific Threshold Based on Prior Agreement The UE may report capability information (or LOS estimation capability) on whether the capability for a time-domain granularity/sampling rate meets or exceeds a predefined/pre-agreed specific threshold. Here, the specific threshold may be a criterion for distinguishing whether CPM or ToA measurement is performed. For example, if the accuracy of the time-domain granularity/sampling rate capability is sufficient (i.e., if the time-domain granularity/sampling rate capability meets or exceeds the specific threshold), the UE may perform CPM instead of ToA measurement for a configured reference signal. On the other hand, if the accuracy of the time-domain granularity/sampling rate capability is insufficient (i.e., if the time-domain granularity/sampling rate capability is less than/less than or equal to the threshold), the UE may perform ToA measurement instead of CPM for the configured reference signal.

As described above, the measurement results to be reported may include the ToA or carrier phase information (or both the ToA and carrier phase information) depending on whether the specific threshold is satisfied. Alternatively, the UE may be instructed to include the ToA or carrier phase information (or both the ToA and carrier phase information). In other words, the UE may change the information included in the measurement report depending on whether the UE has a capability above the specified threshold. In this regard, the UE may report the capability information on whether the time-domain granularity/sampling rate meets requirements based on the specific threshold. In other words, the content included in the measurement results may vary based on reporting the capability information on whether the time-domain granularity/sampling rate satisfies conditions based on the specific threshold.

The UE may report the following measurement results based on reporting the capability information according to the aforementioned options.

Option 2-1: Reporting of Measurement Results for CPP Including Measured Phase Information Based on the capability reporting according to Options 1-1 to 1-4, the UE may report measurement results or values related to CPP including measured phase information. In other words, if the UE reports a capability to perform the phase measurement (or phase measurement with a certain level of accuracy) through the capability reporting or if the UE is instructed by the network to report measurement information on the phase measurement, the UE may report measurement results including the phase information. Alternatively, when the UE reports the measurement results including the measured phase information, the UE may also report a LOS indicator and/or RSRP for each path together with or separately from the measurement results.

Option 2-2: Reporting of Measurement Results Including Both Measured Phase Information and Time-Domain Measurement Information Based on reporting of the capability information according to Options 1-1 to 1-4 described in Scenario 1, the UE may report measurement results for CPP including both measured phase information and time-domain measurement information (e.g., ToA). In other words, it may be determined that the UE reports that a specific capability is satisfied or that the UE is instructed to report measurement results for CPP including both the phase measurement information and time-domain measurement information based on reporting of the capability information on the satisfaction of the specific capability. In this case, the UE may also report a LOS indicator and/or RSRP for each path, which may be included in the existing measurement results, together with or separately from positioning results including the phase measurement information and time-domain measurement information.

(2) Scenario 2: Reporting Capability for Phase-Domain Granularity/Sampling Rate

The performance limitations of positioning through CPP may be related to the (minimum) unit of a phase that the UE is capable of measuring. This is because the principle of CPP involves converting the estimated phase of a carrier into a distance to perform positioning. Therefore, the UE needs to report capability information on the minimum unit of the phase-domain granularity/sampling rate of the UE. Here, a phase-domain granularity/sampling rate refers to the minimum unit of a phase that the UE is capable of estimating or measuring for a received reference signal in the phase or frequency domain. The minimum unit of the phase that the UE is capable of measuring may not correspond one-to-one with the minimum implementable unit of the UE but rather may correspond to the minimum unit that the UE reports for signal processing. Regarding the UE capability for the phase-domain granularity/sampling rate, at least one of the following options (Options 1-1 to 1-3, Option 2-1, and Option 2-2) may be considered.

For the phase-domain granularity/sampling rate described below, one of the predefined granularities (e.g., a list of granularities such as x1, x2, x3) may be reported based on prior agreement, or the actual phase-domain granularity/sampling rate of the UE may be reported directly. Alternatively, an entire phase domain of $[0, 2\pi]$ may be divided into n segments, and the phase-domain granularity/sampling rate may be indicated or expressed through bits representing the segments. For example, if one degree is the minimum unit, the UE may indicate or express the phase-domain granularity/sampling rate using bits corresponding to 360 segments.

Option 1-1: Capability for Phase-Domain Granularity/Sampling Rate Based on BW/SCS The UE may report capability information on different phase-domain granularities/sampling rates depending on the BW and/or SCS. The capability reporting based on the BW and/or SCS may be provided for each BW and/or SCS expected to be configured by the gNB (or location server) (alternatively, the UE may report different capabilities depending on the BW and/or SCS). In other words, the UE may report capability information including the phase-domain granularity/sampling rate for each of the configurable BWs and/or SCSs. For example, the UE may report a phase-domain granularity/sampling rate applied to SCSs less than 30 kHz, a phase-domain granularity/sampling rate applied to SCSs more than or equal to 30 kHz and less than 60 kHz, and a phase-domain granularity/sampling rate applied to SCSs more than 60 KHz.

Option 1-2: Capability for Phase-Domain Granularity/Sampling Rate Based on Frequency The UE may report capabilities for different phase-domain granularities/sampling rates depending on the frequency. Here, the frequency may refer to actual operational frequency bands. For example, the UE may report capability information on phase-domain granularities/sampling rates distinguished by frequency ranges such as FR1 and FR2. Alternatively, the UE may report capabilities in a band-specific manner. The UE may also report capability information on the phase-domain granularity/sampling rate for each frequency band expected to be configured by the gNB (or location server) (alternatively, the UE may report different capabilities depending on the band). Alternatively, the UE may report capability information on the phase-domain granularity/sampling rate for each frequency layer provided in the PRS configuration. In other words, the UE may report capability information on the phase-domain granularity/sampling rate for each frequency layer expected to be configured by the gNB (or location server).

Option 1-3: Reporting Capability for Phase-Domain Granularity/Sampling Rate Based on Number of Measurements Capable of being Performed Simultaneously The UE may report capabilities for different phase-domain granularities/sampling rates based on the number of carriers or frequencies capable of being measured simultaneously. Here, the number of simultaneous measurements may refer to the number of PRSs that may be phase-measured within a certain time duration in the time domain and/or the number of satellite measurements that may be included in a single measurement report from the UE. In this case, the UE may report the capability for a phase-domain granularity/sampling rate for each number of simultaneous measurements. For example, the UE may report in the format of (1, X1), (2, X2), (3, X3), where 1, 2, and 3 represent the number of simultaneous measurements, and X1, X2, and X3 represent phase-domain granularities/sampling rates.

Based on capability information on the phase-domain granularity/sampling rate of the UE reported according to at least one of the above options, the measurement values or measurement information to be included in the measurement result report may vary. The UE may consider at least one of the following options to report measurement information or results related to measurements.

Option 2-1: Reporting of Measurement Results Including Time-Domain Measurement Information If the UE reports capability information based on one of Options 1-1 to 1-3 described in Scenario 2, the UE may include time-domain measurement information (e.g., ToA) in measurement results for CPP. For example, if the UE reports that a specific capability required for phase measurement is satisfied or if the UE is instructed to report measurement results including the phase measurement information, the UE may report the measurement results including the phase measurement information (or both the phase measurement information and time-domain measurement information). On the other hand, if the UE reports that the specific capability required for phase measurement is not satisfied or if the UE is instructed to report measurement results including only the time-domain measurement information, the UE may report the measurement results including the time-domain measurement information rather than the phase measurement information. For example, if the phase-domain granularity/sampling rate reported by the UE as capability information is N bits or less (or if the phase-domain granularity/sampling rate is less than/below a specific threshold), the UE may be instructed to report measurement results including time-domain measurement information as measurement results for CPP. Alternatively, if the phase-domain granularity/sampling rate reported by the UE as capability information is less than/below a specific threshold, the UE may be instructed to report measurement results including time-domain measurement information instead of phase measurement. In this case, the measurement results may also include a LOS indicator and/or RSRP for each path, which are typically included in time-domain related measurement reports.

Option 2-2: Reporting of Measurement Results Including Both Phase Measurement Information and Time-Domain Measurement Information If the UE reports capability information based on one of Options 1-1 to 1-3 described in Scenario 2, the UE may include both phase measurement information and time-domain measurement information in measurement results for CPP. That is, the UE may report that a specific capability is satisfied (for example, when the phase-domain granularity/sampling rate is above/more than a specific threshold). Alternatively, the UE may be instructed to report measurement results including the phase measurement information and time-domain measurement information (e.g., ToA) based on the capability information. In this case, the measurement results may include not only the phase measurement information and time-domain measurement information but also a LoS indicator and/or RSRP for each path, which are typically included in time-domain related measurement reports.

2. Multiple Measurement Capabilities

The UE may have multiple measurement capabilities related to phase measurements over a plurality of carriers. Multiple measurement capabilities refer to the actual capabilities of the UE, which may be included in the capability report of the UE. However, the multiple measurement capabilities may also be provided as assistance information to the gNB (or location server) (depending on preferences). Additionally, the capability or assistance information, which will be described later, may be reported for each of the following options, but it is also possible to consider reporting all or some of the capabilities presented in the options as a single piece of capability information or assistance information to the gNB (or location server).

The multiple measurement capabilities may vary depending on the UE implementation. However, the UE may report the multiple measurement capabilities (for CPP phase measurement) by considering the number of phase-locked loops (PLLs) used for carrier phase measurement/tracking. For example, the UE may have a capability to measure/track the phases of a plurality of carriers simultaneously, and the UE may report information on the capability to the gNB (or location server) as the capability of the UE.

Alternatively, depending on the UE implementation, capability information on the multiple measurement capabilities of the UE may be defined and reported based on an algorithm used for carrier phase measurement/tracking. For example, the UE may have a capability to measure the phase of only a single carrier (single subcarrier) or a capability to measure the phases of multiple carriers simultaneously for a configured reference signal. The UE may report such capability information to the gNB (or location server).

Based on reporting of the aforementioned capability information, the UE may expect to be configured to perform phase measurement on carriers that do not exceed the capability thereof. In other words, the UE may expect a configuration related to phase measurement based on the capability information that the UE reports. For example, if the number of PRS resource sets/frequency layers that may be configured for the UE is limited in assistance data, the UE may expect the number of PRS resource sets/frequency layers configured for the UE to be restricted according to the capability information. Alternatively, the number of PRS resource sets/frequency layers configured for the UE may be restricted based on the capability information. If the UE reports that the UE is capable of performing multi-phase measurement, the UE may also expect that multiple PRSs will be configured for future Rx clock elimination.

3. Error Capability

The error capability refers to the actual capability of the UE, which may be included in the capability report of the UE. However, the error capability may also be provided as assistance information to the gNB (or location server) (depending on preferences). Additionally, the capability or assistance information, which will be described later, may be reported for each of the following options, but it is also possible to consider reporting all or some of the capabilities presented in the options as a single piece of capability information or assistance information to the gNB (or location server).

Depending on the UE implementation, capability information on the capability for clock errors at the transmitter or receiver may be defined. Here, the clock error at the transmitter or receiver refers to the presence or absence of a time difference (t_delta) when the UE transmits or receives at a time point (t0+t_delta), which is different from an indicated/agreed time point (t0) or the magnitude of the time difference. The clock error may be negligible in other positioning techniques, but since CPP-related measurement involves converting a time into a distance, a difference related to the clock error may affect measurement results related to CPP.

Therefore, capability information on the presence or variance of the Tx/Rx clock error of the UE may be defined. That is, it may be considered that the UE reports the presence or absence of a clock error at the transmitter and/or receiver thereof to the gNB via a 1-bit indicator or reports the variance and/or periodicity of the clock error at the transmitter and/or receiver as information on the UE capability. Based on reporting of the capability information, the UE may expect a configuration from the gNB (or location server) as follows.

- If the UE reports the presence of an Rx clock error or that the variance of the Rx clock error exceeds a specific value, the UE may expect Tx differencing (e.g., PRS from different Tx-same Rx) to be performed for error elimination when performing CPP measurement for DL. Alternatively, the UE may be configured with no CPP measurement for DL.
- If the UE reports the presence of a Tx clock error or that the variance of the Tx clock error exceeds a specific value, the UE may expect Rx differencing (e.g., same Tx-different Rx) to be performed for error elimination when performing CPP measurement for UL. Alternatively, the UE may be configured with no CPP measurement for UL.

Alternatively, instead of reporting capability information that directly indicates the presence of a Tx/Rx clock error, the UE may report capability information on a specific time unit (or time-domain window) that ensures or accommodates clock errors below a specific level to the gNB (or location server). Here, the time-domain window may correspond to a maximum time during which the UE is capable of estimating a phase within a specific variance while aligning and tracking the phase. The UE needs to ensure that there are no cycle slips in the measurement report within the reported time-domain window, and the gNB (or location server) may configure the UE to perform measurement reporting in units of the reported time-domain window (or with a periodicity shorter than the time-domain window). Alternatively, the UE may estimate integer ambiguity only once within the reported time-domain window, and the gNB (or location server) may assume or understand that the integer ambiguity remains consistent within the same time-domain window.

Figure 12:
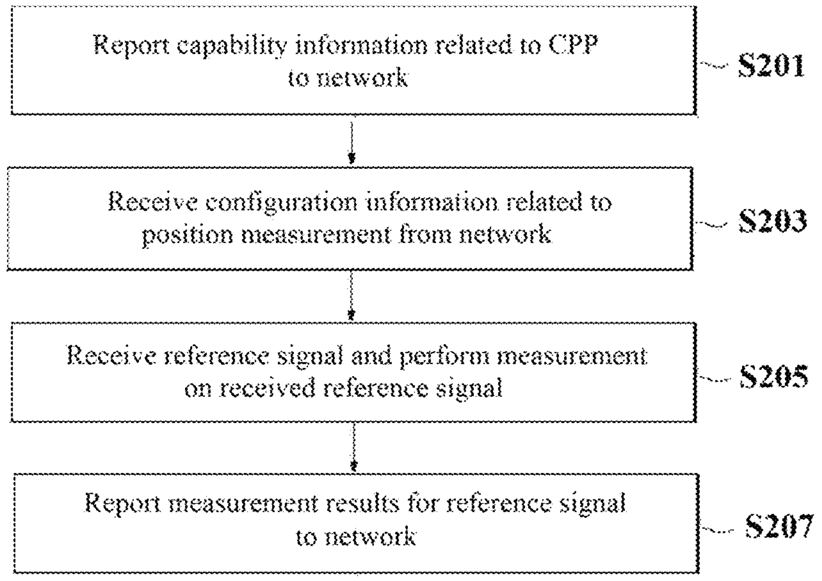
FIG. 12 is a diagram for explaining a method by which a UE performs positioning measurement.

FIG. 12 is a diagram for explaining a method by which a UE performs positioning measurement.

Referring to FIG. 12, the UE may report capability information related to positioning or CPP to a network (S201). As described above, the capability information may include information required to determine whether the UE is capable of performing CPP-based measurement. For example, the capability information may include a LOS estimation capability, a phase measurement capability, multiple measurement capabilities, and/or an error capability. As described above, the LOS estimation capability may be determined based on a time-domain granularity or sampling rate, or the LOS estimation capability may represent the time-domain granularity or sampling rate directly. Similarly, the phase measurement capability may be a value determined based on a phase-domain granularity or sampling rate, or the phase measurement capability may represent the phase-domain granularity or sampling rate directly. For example, the LOS estimation capability may have a higher value as the granularity in the time domain decreases or the sampling rate in the time domain increases (i.e., as the unit for measuring the time in the time domain becomes finer). Alternatively, the LOS estimation capability may include indication information indicating that the CPP is capable of being performed when the time-domain granularity is below a specific granularity or the sampling rate is above a specific rate. Meanwhile, the network may include the aforementioned gNB and/or location server. Additionally, the capability information may be included in assistance information and transmitted to the network.

Alternatively, the UE may report the capability information including the LOS estimation capability for each of SCSs or BWs that has been or will be configured by the network. Alternatively, the UE may report the capability information including the LOS estimation capability for each of the numbers of carriers where phase measurement is performed simultaneously (or within a specific time period).

Next, the UE may receive configuration information related to positioning from the network (S203). The configuration information may include information on a PRS configuration for positioning. Alternatively, the configuration information may further include indication information on whether to perform phase measurement for the CPP on the PRS based on the PRS configuration and whether to report the information on the phase measurement. Additionally, the configuration information may include information on a plurality of measurement frequencies on which the CPP is to be performed.

Next, the UE may perform measurement on a reference signal received from the network (S205). The measurement may include at least one of the following: phase measurement for the CPP on the reference signal or ToA measurement on the reference signal. Based on the configuration information, the UE may perform the phase measurement on the reference signal and/or time measurement (ToA) in the time domain for the reference signal.

In one example, whether to perform the phase measurement on the reference signal for the CPP may be determined based on the LOS estimation capability. For instance, if the UE reports capability information including a LOS estimation capability above a specific threshold, the configuration information may include separate indication information on the phase measurement based on the CPP and/or PRS configuration information for the CPP. On the other hand, if the UE reports capability information including a LOS estimation capability less than the specific threshold, the configuration information may include configuration information related to ToA or AoA measurements in the time domain (without indication information for performing the phase measurement based on the CPP). Alternatively, even without specific instructions based on the configuration information, the UE may perform phase measurement on the received reference signal based on the reported LOS estimation capability above the specific threshold. Alternatively, the UE may expect that the phase measurement is instructed based on the reported capability based on the reported LOS estimation capability.

Next, the UE may report measurement results of the reference signal to the network (S207). The UE may determine measurement information to be included in the measurement results based on the capability information. Alternatively, the UE may be configured with the measurement information to be included in the measurement results based on the capability information.

For example, whether phase information on the reference signal is to be included in the measurement results may be determined based on the LOS estimation capability. Specifically, the UE may report the measurement results including the phase information measured for the reference signal based on the LOS estimation capability above the specified threshold. In this case, the UE may also include the time information (e.g., ToA) measured for the reference signal in the measurement results along with the phase information. On the other hand, the UE may not measure the phase of the reference signal based on the LOS estimation capability below the specified threshold but may report the measurement results including only the time information measured for the reference signal. Alternatively, if the UE reports the LOS estimation capability above the specific threshold, the UE may receive configuration information instructing the UE to report the measurement results including the measured phase information. Alternatively, if the UE reports the LOS estimation capability below the specified threshold, the UE may receive configuration information instructing the UE to report the measurement results including the time information rather than the phase measurement on the reference signal.

Alternatively, the UE may report to the network the capability information including the error capability, which is information on clock errors at the receiver and transmitter. In this case, whether the CPP is performed for DL or UL may be determined based on the reported error capability.

Figure 13:
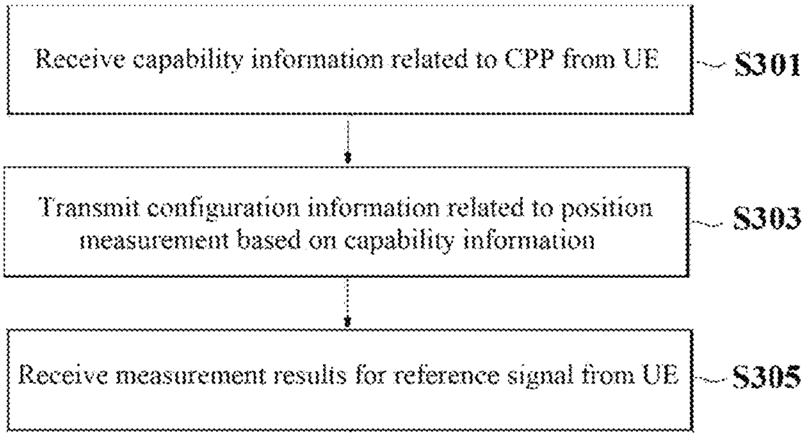
FIG. 13 is a diagram for explaining a method by which a network receives measurement results reported from a UE.

FIG. 13 is a diagram for explaining a method by which a network receives measurement results reported from a UE.

Referring to FIG. 13, the network may receive capability information related to positioning or CPP from the UE (S301). As described above, the capability information may include a LOS estimation capability, a phase measurement capability, multiple measurement capabilities, and/or an error capability. Alternatively, the capability information may include a LOS estimation capability determined for each SCS or BW. Alternatively, the capability information may include a LOS estimation capability determined for each of the numbers of carriers where phase measurement is performed simultaneously (or within a specific time period). Meanwhile, the network may also obtain the capability information from assistance information provided by the UE.

Next, the network may determine configuration information related to positioning based on the capability information and transmit the configuration information to the UE (S303). Specifically, if capability information including a LOS estimation capability above a specific threshold is reported, the network may transmit to the UE configuration information indicating conventional time-domain measurement such as ToA, without instructions for performing phase measurement for the CPP. On the other hand, if capability information including a LOS estimation capability less than the specified threshold is reported, the network may transmit to the UE configuration information indicating conventional time-domain measurement such as ToA, without instructions for performing the phase measurement for the CPP. Alternatively, the configuration information may include information on a plurality of measurement frequencies on which the CPP is to be performed and/or PRS configuration information related to the execution of the CPP.

Next, the network may transmit a reference signal to the UE based on the configuration information and receive measurement results for the reference signal from the UE (S305). The measurement results may include phase information measured for the reference signal based on the capability information and/or time-domain information (e.g., ToA) measured for the reference signal based on the capability information.

For example, whether the phase information on the reference signal is included in the measurement results may be determined based on the LOS estimation capability. Specifically, the measurement results may include the phase information measured for the reference signal if the LOS estimation capability is above the specified threshold. In this case, the measurement results may also include the time information (e.g., ToA) measured for the reference signal. On the other hand, if the LOS estimation capability is less than the specified threshold, the measurement results may include only the time information measured for the reference signal without the phase measurement information.

As described above, by determining whether CPP is performed based on capability information related to the CPP execution such as a LOS estimation capability, the network may perform UE positioning based on the CPP using phase information with a specific level of accuracy. Accordingly, the network may receive measurement results including the phase information for the CPP only from UEs capable of ensuring the specific level of accuracy. Thus, even if a new CPP-based positioning technique is introduced, the signaling load between the network and the UE may be minimized. Furthermore, whether the CPP is performed may be clearly determined and/or indicated via capability information, which is a criteria for performing the CPP between the network and the UE.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 14:
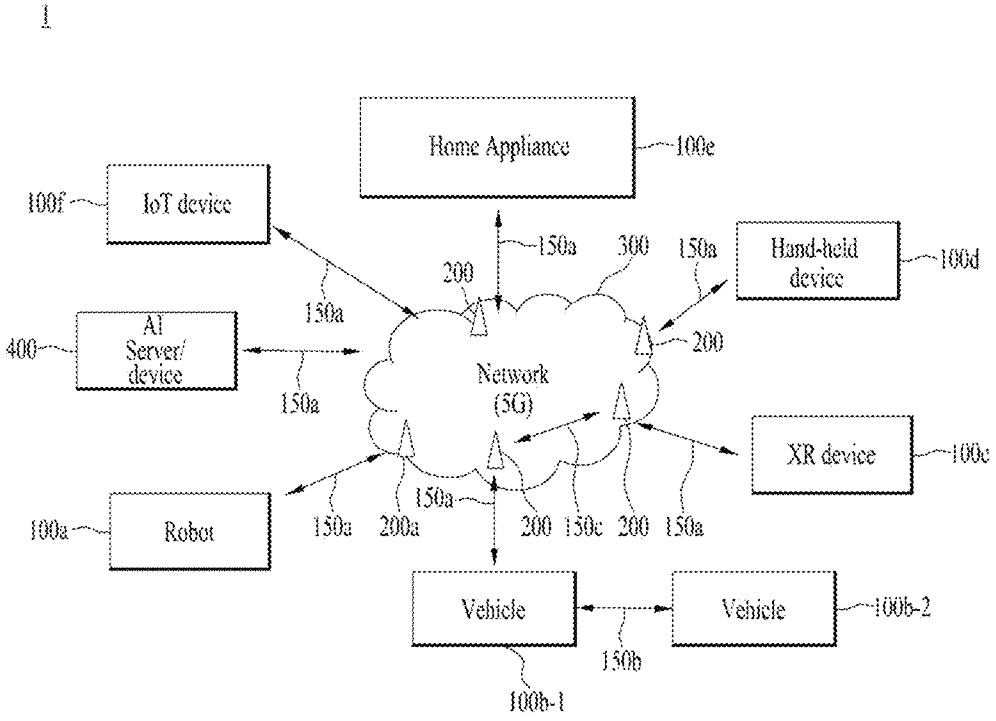
FIG. 14 illustrates a communication system applied to the present disclosure.

FIG. 14 illustrates a communication system applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 15:
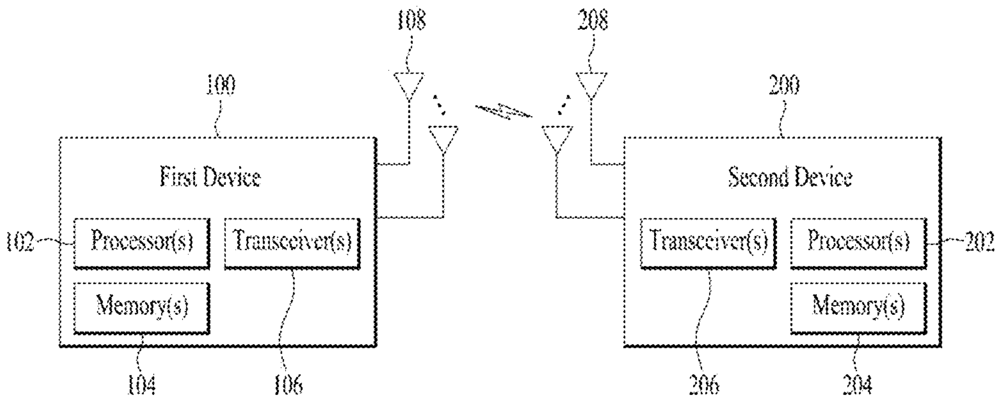
FIG. 15 illustrates wireless devices applicable to the present disclosure.

FIG. 15 illustrates a wireless device applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

According to an embodiment, the first wireless device 100 or a UE may include the processor(s) 102 connected to the RF transceiver(s) and the memory(s) 104. The memory(s) 104 may include at least one program for performing operations related to the embodiments described above with reference to FIGS. 10 to 13.

Specifically, the processor(s) 102 may be configured to: control the RF transceiver(s) 106 to report capability information of the UE, wherein the capability information is related to position measurement; receive configuration information for the positioning measurement; perform measurement on a reference signal based on the configuration information; and report measurement results for the reference signal. The capability information may include information on a LOS estimation capability related to phase measurement for CPP.

Alternatively, a chipset including the processor(s) 102 and the memory(s) 104 may be configured. The chipset may include: at least one processor; and at least one memory operably connected to the at least one processor and configured to, when executed, cause the at least one processor to perform operations. The operations may include: reporting capability information of the UE, wherein the capability information is related to position measurement; receiving configuration information for the positioning measurement; performing measurement on a reference signal based on the configuration information; and reporting measurement results for the reference signal. The capability information may include information on a LOS estimation capability related to phase measurement for CPP. In addition, the at least one processor may perform operations related to the embodiments described with reference to FIGS. 10 to 13 based on a program included in the memory.

Alternatively, there is provided a computer-readable storage medium including at least one computer program configured to cause at least one processor to perform operations. The operations may include: reporting capability information of the UE, wherein the capability information is related to position measurement; receiving configuration information for the positioning measurement; performing measurement on a reference signal based on the configuration information; and reporting measurement results for the reference signal. The capability information may include information on a LOS estimation capability related to phase measurement for CPP. In addition, the computer program may include programs for performing operations related to the embodiments described in FIGS. 10 to 13.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

According to an embodiment, the BS or a network may include the processor(s) 202, the memory(s) 204, and/or the transceiver(s) 206. The processor(s) 202 may be configured to: control the transceiver(s) 206 or RF transceiver to receive capability information related to position measurement for a UE; transmit configuration information for the position measurement based on the capability information; transmit at least one reference signal based on the configuration information; and receive measurement results for the at least one reference signal. The capability information may include information on a LOS estimation capability related to phase measurement for CPP.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
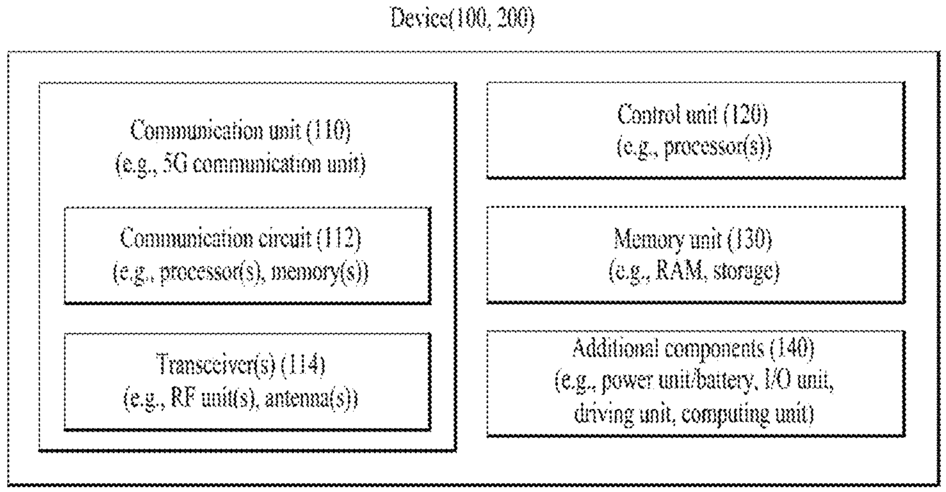
FIG. 16 illustrates another example of a wireless device to which the present disclosure is applied.

Examples of Application of Wireless Devices to which the Present Invention is Applied FIG. 16 illustrates another example of a wireless device applied to the present disclosure.

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 14), the vehicles (100*b*-1 and 100*b*-2 of FIG. 14), the XR device (100*c* of FIG. 14), the hand-held device (100*d* of FIG. 14), the home appliance (100*e* of FIG. 14), the IoT device (100*f* of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology may generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL APPLICABILITY

The above-described embodiments of the present disclosure are applicable to various mobile communication systems.

The invention claimed is:

1. A method of performing positioning-related measurement by a user equipment (UE) in a wireless communication system, the method comprising:
   - reporting capability information of the UE, wherein the capability information is related to position measurement;
   - receiving configuration information for the positioning measurement;
   - performing measurement on a received reference signal based on the configuration information; and
   - reporting measurement results for the reference signal,
   - wherein the capability information includes information on a line of sight (LOS) estimation capability related to phase measurement for carrier phase positioning (CPP),
   - wherein based on that the LOS estimation capability is higher than or equal to a specific threshold, the configuration information includes information for instructing to report the measurement results including phase information measured for the reference signal and a time of arrival (ToA) measured for the reference signal, and
   - wherein based on that the LOS estimation capability is lower than a specific threshold, the configuration information includes information for instructing to report the measurement results including a time of arrival (ToA) measured for the reference signal.

2. The method of claim 1, wherein the LOS estimation capability is determined based on a granularity or sampling rate in a time domain, and
   - wherein inclusion of phase measurement information for the reference signal in the measurement results is determined based on the LOS estimation capability.

3. The method of claim 1, wherein the capability information includes the LOS estimation capability depending on a subcarrier spacing (SCS) or a frequency band.

4. The method of claim 1, wherein the capability information includes the LOS estimation capability depending on a number of carriers capable of being measured simultaneously.

5. The method of claim 1, wherein the capability information further includes information on a granularity or sampling rate in a phase domain.

6. The method of claim 1, wherein the capability information further includes at least one of information on whether the phase measurement is performed on a plurality of carriers, information on a receiver clock error related to signal reception, or information on a transmitter clock error related to signal transmission.

7. The method of claim 1, wherein the capability information is included in assistance information and transmitted to a network.

8. A user equipment (UE) configured to perform positioning-related measurement in a wireless communication system, the UE comprising:

a radio frequency (RF) transceiver; and a processor connected to the RF transceiver, wherein the processor is configured to:

control the RF transceiver to report capability information of the UE, wherein the capability information is related to position measurement;

receive configuration information for the positioning measurement;

perform measurement on a reference signal based on the configuration information; and report measurement results for the reference signal, and wherein the capability information includes information on a line of sight (LOS) estimation capability related to phase measurement for carrier phase positioning (CPP), wherein based on that the LOS estimation capability is higher than or equal to a specific threshold, the configuration information includes information for instructing to report the measurement results including phase information measured for the reference signal and a time of arrival (ToA) measured for the reference signal, and wherein based on that the LOS estimation capability is lower than a specific threshold, the configuration information includes information for instructing to report the measurement results including a time of arrival (ToA) measured for the reference signal.

9. A method of receiving, by a network, measurement results from a user equipment (UE) in a wireless communication system, the method comprising:

receiving capability information related to position measurement for the UE;

transmitting configuration information for the position measurement based on the capability information;

transmitting at least one reference signal based on the configuration information; and receiving the measurement results for the at least one reference signal, wherein the capability information includes information on a line of sight (LOS) estimation capability related to phase measurement for carrier phase positioning (CPP), wherein based on that the LOS estimation capability is higher than or equal to a specific threshold, the configuration information includes information for instructing to report the measurement results including phase information measured for the reference signal and a time of arrival (ToA) measured for the reference signal, and wherein based on that the LOS estimation capability is lower than a specific threshold, the configuration information includes information for instructing to report the measurement results including a time of arrival (ToA) measured for the reference signal.

* * * * *